(12) United States Patent
Groninga et al.

(10) Patent No.: US 10,377,480 B2
(45) Date of Patent: Aug. 13, 2019

(54) APPARATUS AND METHOD FOR DIRECTING THRUST FROM TILTING CROSS-FLOW FAN WINGS ON AN AIRCRAFT

(71) Applicant: Bell Helicopter Textron Inc., Fort Worth, TX (US)

(72) Inventors: Kirk L. Groninga, Keller, TX (US); Daniel B. Robertson, Southlake, TX (US); Matthew E. Louis, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 263 days.

(21) Appl. No.: 15/483,602

(22) Filed: Apr. 10, 2017

(65) Prior Publication Data
US 2018/0044013 A1    Feb. 15, 2018

Related U.S. Application Data

(63) Continuation-in-part of application No. 15/252,916, filed on Aug. 31, 2016, now Pat. No. 10,106,253, and
(Continued)

(51) Int. Cl.
*B64C 15/12* (2006.01)
*B64C 29/00* (2006.01)
(Continued)

(52) U.S. Cl.
CPC ............ *B64C 29/0033* (2013.01); *B64C 3/32* (2013.01); *B64C 15/12* (2013.01); *B64C 23/02* (2013.01);
(Continued)

(58) Field of Classification Search
CPC .......... B64C 3/32; B64C 15/12; B64C 23/02; B64C 29/0033; B64C 39/005;
(Continued)

(56) References Cited

U.S. PATENT DOCUMENTS 516,581 A  *  3/1894  Wellner ............... B64C 11/006
                                                    416/108
1,487,228 A      3/1924  Garcia
(Continued)

FOREIGN PATENT DOCUMENTS

CN      204674831 U     9/2015
CN      104276284 B     4/2016
(Continued)

OTHER PUBLICATIONS

EP Communication under Rule 71(3)—Intention to Grant, dated Jul. 20, 2018, by the EPO, re EP Patent Application No. 17185544.8.
(Continued)

*Primary Examiner* — Claude J Brown
(74) *Attorney, Agent, or Firm* — Timmer Law Group, PLLC

(57) ABSTRACT

A variable thrust cross-flow fan system for an aircraft including a rotatable wing member having a first housing member; an actuator assembly operably coupled to the first housing member; and a variable thrust cross-flow fan assembly including a first and second driver plates having a plurality of blades rotatably mounted therebetween. The plurality of blades has a circular path of travel when rotating and includes a control assembly coupled to the plurality of blades to generate a variable thrust force. The control assembly includes a control cam that is substantially non-rotatable relative to the first and second driver plates and a hinge member that is fixedly connected to the control cam and to the first housing member at a hinge axis. Rotation of the first housing member by the actuator assembly imparts rotation of the control cam about the hinge axis, thereby changing the direction of the variable thrust force.

19 Claims, 36 Drawing Sheets

Related U.S. Application Data a continuation-in-part of application No. 15/233,897, filed on Aug. 10, 2016, now Pat. No. 10,279,900.

(51) Int. Cl.
| | |
|---|---|
| *B64C 3/32* | (2006.01) |
| *B64D 27/24* | (2006.01) |
| *F04D 17/04* | (2006.01) |
| *F04D 29/28* | (2006.01) |
| *B64C 23/02* | (2006.01) |
| *B64C 39/00* | (2006.01) |
| *B64D 27/02* | (2006.01) |

(52) U.S. Cl.
CPC ............ *B64C 39/005* (2013.01); *B64D 27/24* (2013.01); *F04D 17/04* (2013.01); *F04D 29/282* (2013.01); *F04D 29/287* (2013.01); *B64D 2027/026* (2013.01)

(58) Field of Classification Search
CPC ... B64D 27/24; B64D 2027/026; F04D 17/04; F04D 29/282; F04D 29/287
See application file for complete search history.

(56) References Cited

U.S. PATENT DOCUMENTS

| | | | | | |
|---|---|---|---|---|---|
| 1,761,053 | A | * | 6/1930 | Rystedt | ................. B64C 39/008 244/102 R |
| 1,796,016 | A | * | 3/1931 | Fricke | ................... B64C 39/005 244/9 |
| 1,885,640 | A | * | 11/1932 | Strandgren | ........... B64C 11/006 416/108 |
| 1,893,621 | A | * | 1/1933 | Hansen | ................. B64C 11/006 416/108 |
| 2,250,772 | A | * | 7/1941 | Mueller | ................... B63H 1/10 416/108 |
| 3,065,928 | A | * | 11/1962 | Dornier | ................... B64C 23/08 244/10 |
| 3,212,735 | A | | 10/1965 | Laing | |
| 4,194,707 | A | * | 3/1980 | Sharpe | ................... B64C 3/141 244/12.3 |
| 4,752,258 | A | * | 6/1988 | Hochleitner | ............. B63H 1/10 416/108 |
| 5,100,080 | A | | 3/1992 | Servanty | |
| 6,007,021 | A | | 12/1999 | Tsepenyuk | |
| 6,352,219 | B1 | * | 3/2002 | Zelic | ................... B64C 11/006 244/12.1 |
| 6,932,296 | B2 | * | 8/2005 | Tierney | ..................... B64B 1/30 244/12.2 |
| 7,219,854 | B2 | * | 5/2007 | Boschma, Jr. | ........... B60V 1/08 114/67 A |
| 7,518,864 | B2 | | 4/2009 | Kimura | |
| 7,594,625 | B2 | | 9/2009 | Robertson et al. | |
| 7,641,144 | B2 | | 1/2010 | Kummer et al. | |
| 7,731,121 | B2 | | 6/2010 | Smith et al. | |
| 7,931,233 | B2 | | 4/2011 | Arafat et al. | |
| 8,448,905 | B2 | * | 5/2013 | Peebles | ................. B64C 39/005 244/10 |
| 8,469,308 | B2 | | 6/2013 | Robertson et al. | |
| 8,528,855 | B2 | * | 9/2013 | Seifert | ................... B64C 39/005 244/21 |
| 8,636,243 | B2 | | 1/2014 | Robertson | |
| 8,727,265 | B2 | | 5/2014 | Altmikus et al. | |
| 9,260,185 | B2 | | 2/2016 | Covington et al. | |
| 9,346,535 | B1 | * | 5/2016 | Adams | .................... B64C 11/30 |
| 9,409,643 | B2 | | 8/2016 | Mores et al. | |
| 9,452,832 | B2 | | 9/2016 | Heid | |
| 2005/0274843 | A1 | * | 12/2005 | Schwaiger | ............ B64C 39/008 244/21 |
| 2006/0249621 | A1 | | 11/2006 | Stephens | |
| 2007/0200029 | A1 | | 8/2007 | Sullivan | |
| 2010/0150714 | A1 | | 6/2010 | Kolacny | |
| 2011/0101173 | A1 | | 5/2011 | Peebles | |
| 2012/0032447 | A1 | | 2/2012 | Bang-Moeller | |
| 2012/0091257 | A1 | | 4/2012 | Wolff et al. | |
| 2012/0111994 | A1 | | 5/2012 | Kummer et al. | |
| 2012/0234968 | A1 | | 9/2012 | Smith | |
| 2012/0256042 | A1 | * | 10/2012 | Altmikus | ................ B64C 27/82 244/17.21 |
| 2012/0312916 | A1 | | 12/2012 | Groninga | |
| 2013/0119186 | A1 | | 5/2013 | Heid | |
| 2015/0197335 | A1 | | 7/2015 | Dekel et al. | |
| 2016/0152334 | A1 | | 6/2016 | Prisell | |
| 2016/0214710 | A1 | | 7/2016 | Brody et al. | |
| 2016/0376003 | A1 | * | 12/2016 | Feldman | ............... B64C 39/005 703/2 |
| 2018/0044010 | A1 | | 2/2018 | Groninga et al. | |
| 2018/0044012 | A1 | | 2/2018 | Groninga et al. | |

FOREIGN PATENT DOCUMENTS

| | | | |
|---|---|---|---|
| EP | 0393752 | A1 | 10/1990 |
| EP | 2511177 | A1 | 10/2012 |
| EP | 2808253 | A1 | 12/2014 |
| EP | 3281863 | A1 | 2/2018 |
| EP | 3281865 | A1 | 2/2018 |
| EP | 3281865 | B1 | 10/2018 |
| FR | 636843 | A | 4/1928 |
| FR | 2375090 | A1 | 7/1978 |
| GB | 885663 | A | 12/1961 |
| GB | 2316374 | A | 2/1998 |
| JP | 2009-51381 | A | 3/2009 |
| WO | 2007106137 | A1 | 9/2007 |

OTHER PUBLICATIONS

European Search Report, Application No. 16188806.0, European Patent Office, dated Aug. 8, 2017.
European Examination Report, Application No. 16188806.0, European Patent Office, dated Aug. 30, 2017.
European Examination Report, dated Jan. 26, 2018, by the EPO, re EP Patent App No. 16188806.0.
European Search Report, dated Jan. 12, 2018, by the EPO, regarding EP Application No. 17185544.8.
European Exam Report, dated Jan. 9, 2018, by the EPO, regarding EP Application No. 17185578.6.
EP Communication under Rule 71(3)—Intention to Grant, dated Sep. 4, 2018, by the EPO, re EP Patent Application No. 17185578.6.
European Search Report, dated Dec. 14, 2017, by the EPO, re EP application No. 17185578.6.
European Examination Report, dated Dec. 5, 2017, by the EPO, re EP application No. 17163296.1.
Decision to Grant, dated Sep. 20, 2018, by the EPO, re EP Patent App No. 17185544.8.
CA Office Action, dated Oct. 2, 2018, by the CIPO, re CA Patent App No. 2,976,077.
Decision to Grant, dated Nov. 22, 2018, by the EPO, re EP Patent App No. 17185578.6.
CA Notice of Allowance, dated Jan. 9, 2019, by the CIPO, re CA Patent App No. 2,976,079.
Office Action, dated Mar. 8, 2019, by the USPTO, re U.S. Appl. No. 15/483,541.
Office Action, dated Mar. 12, 2019, by the USPTO, re U.S. Appl. No. 15/483,652.

* cited by examiner

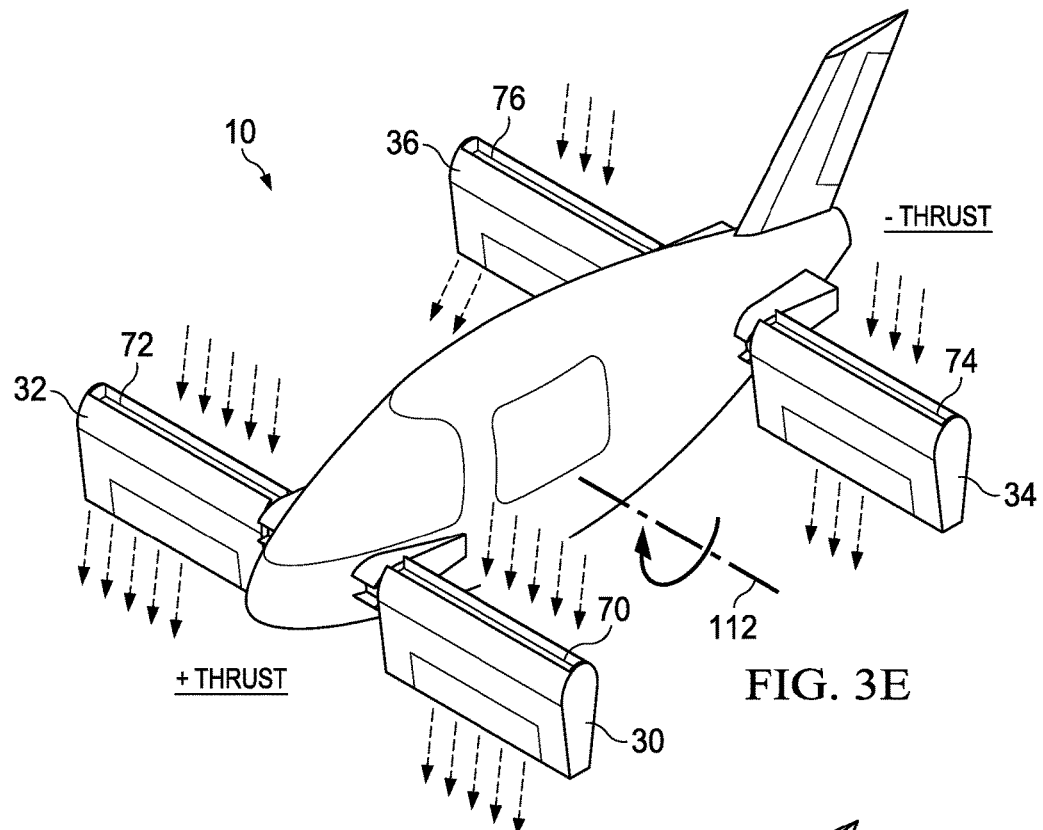
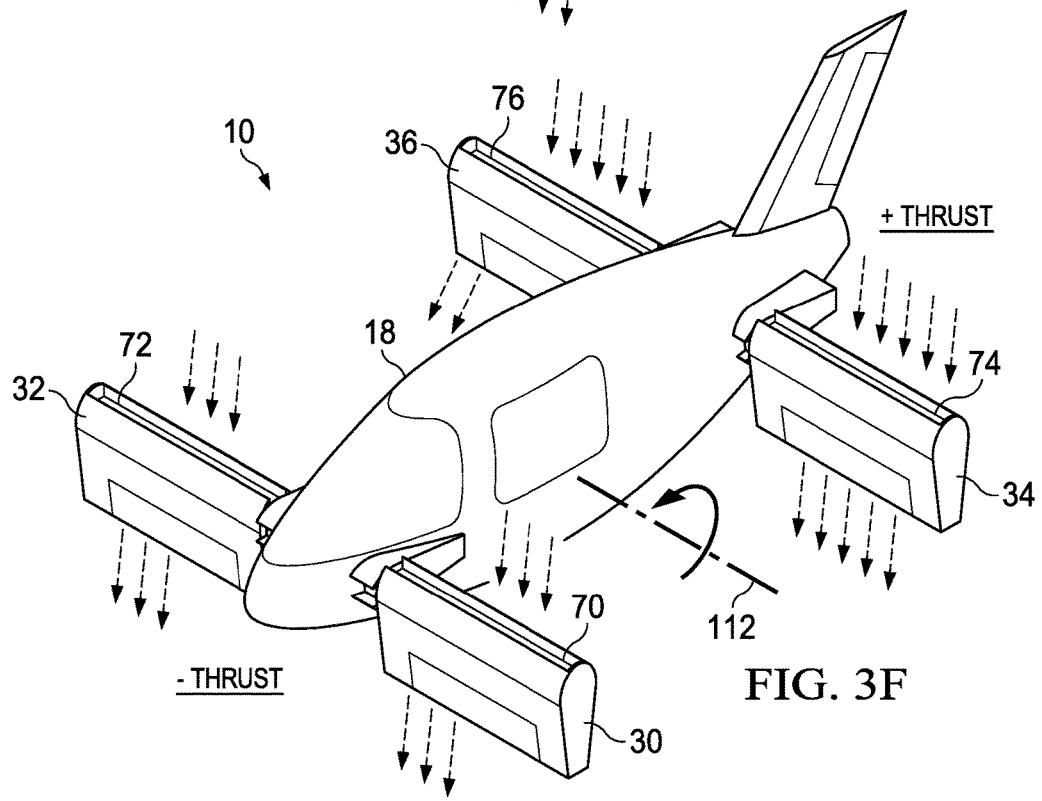

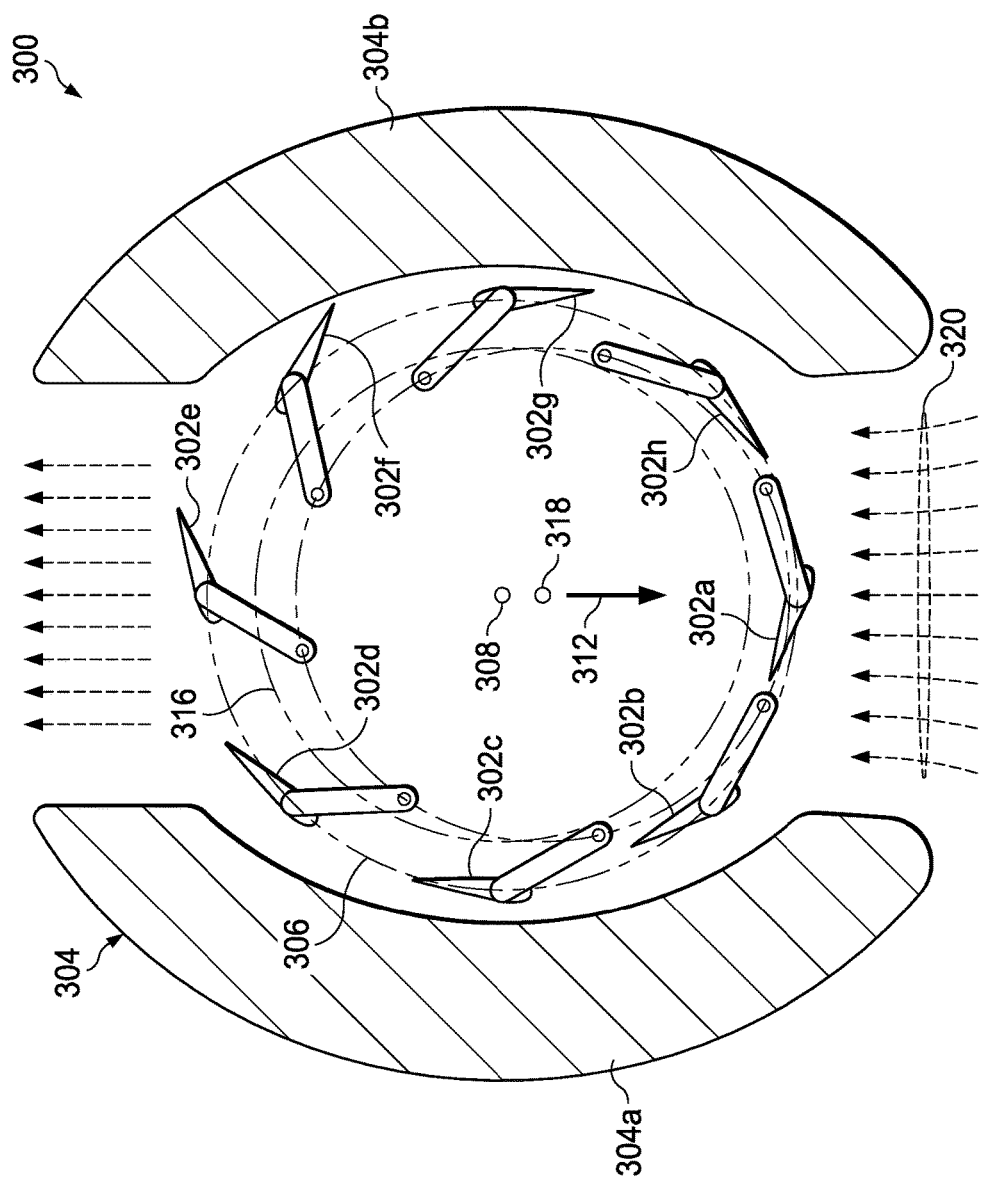

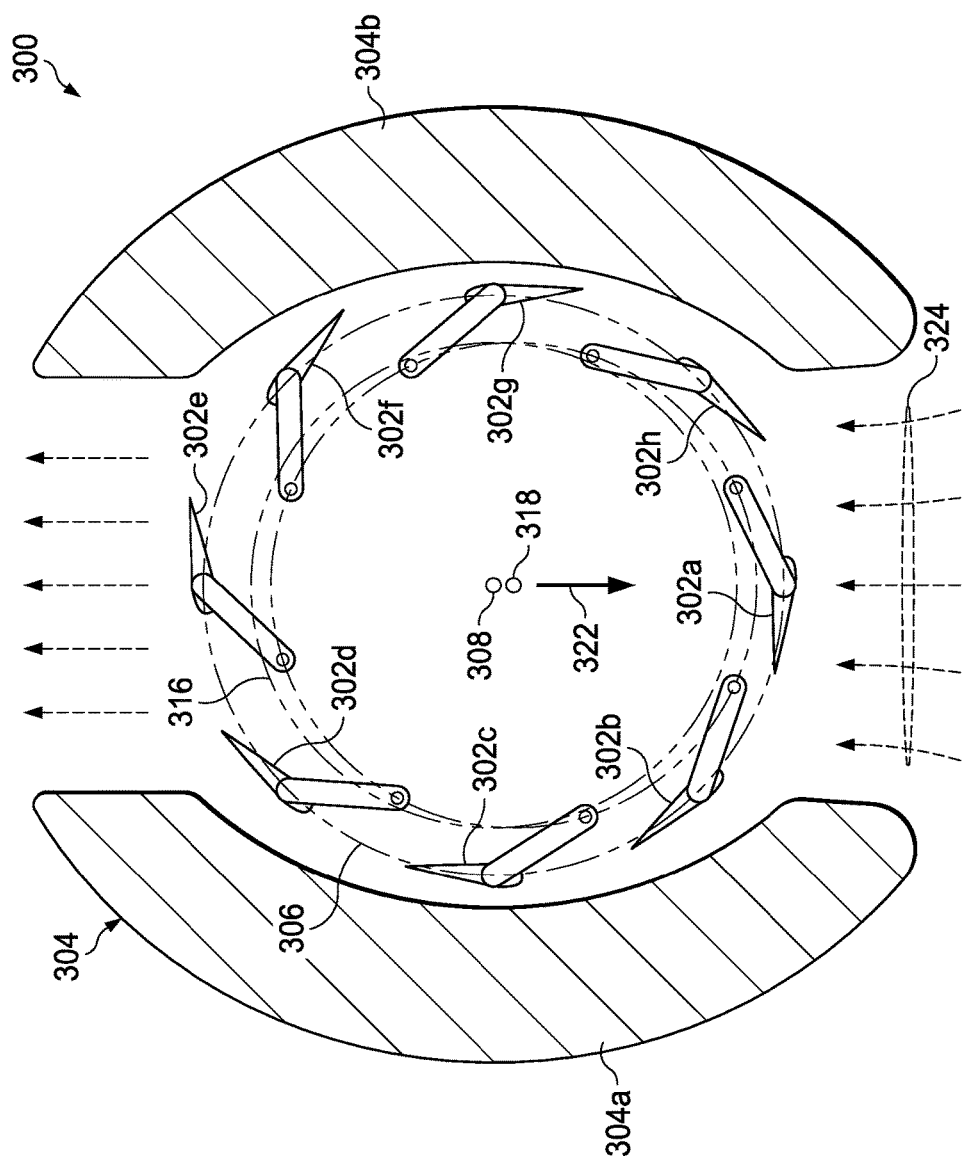

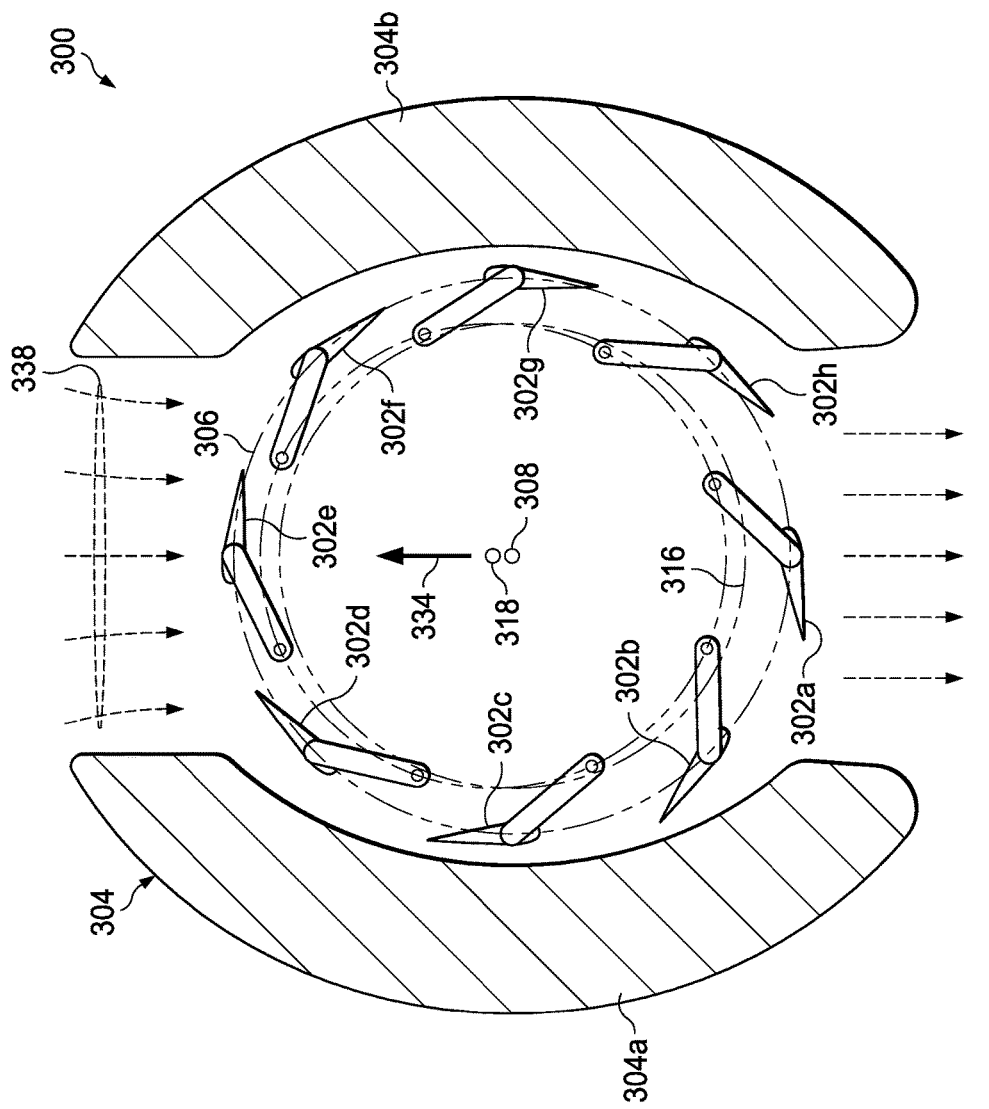

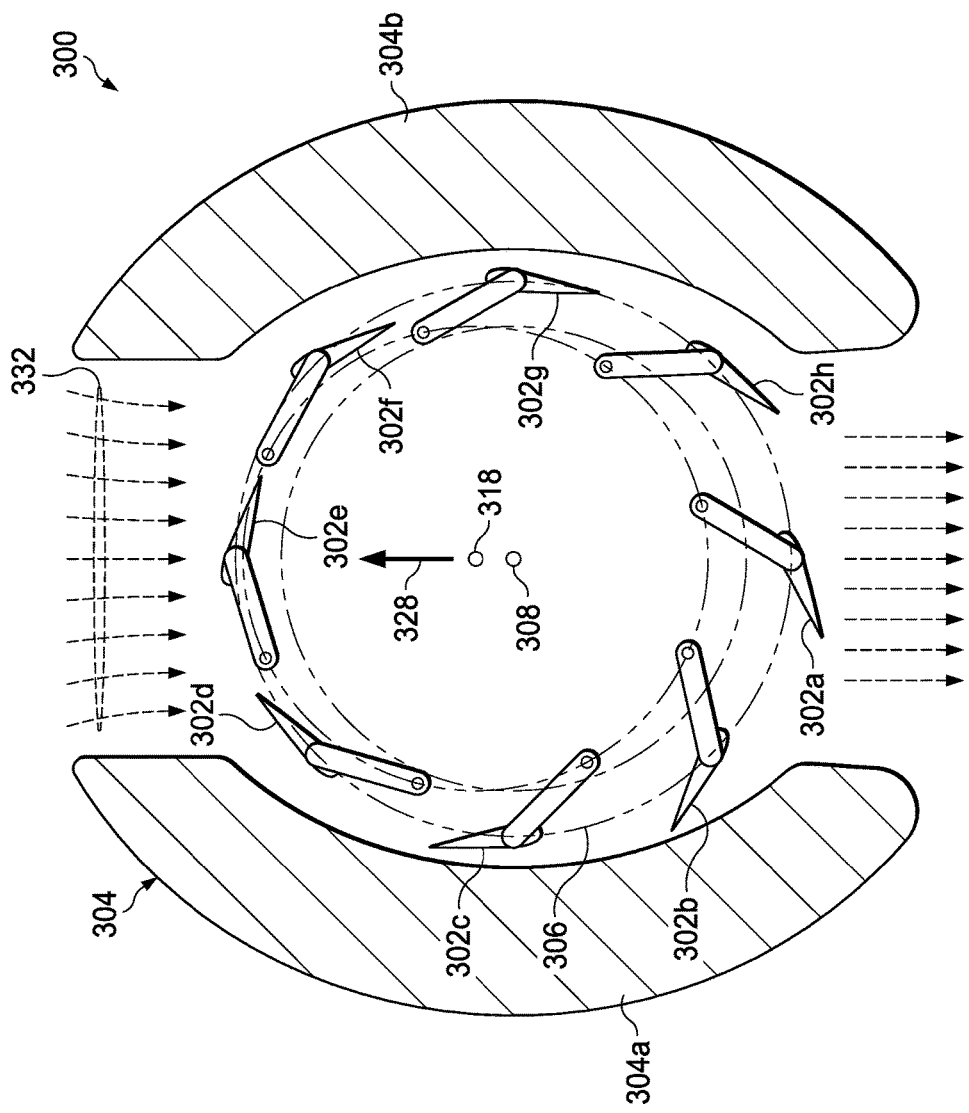

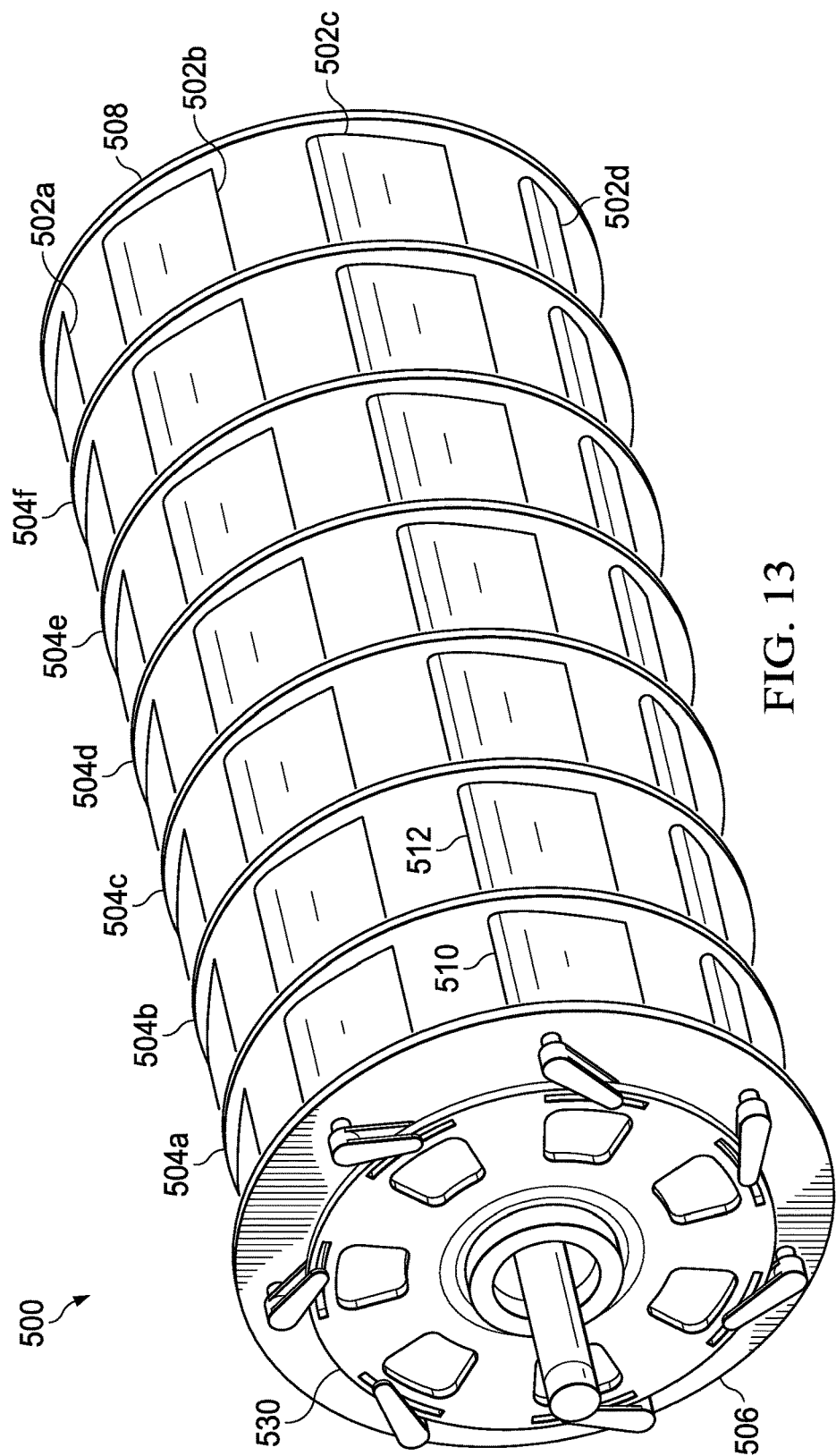

APPARATUS AND METHOD FOR DIRECTING THRUST FROM TILTING CROSS-FLOW FAN WINGS ON AN AIRCRAFT

CROSS-REFERENCE TO RELATED APPLICATIONS

This application claims priority to U.S. patent application Ser. No. 15/233,897, filed Aug. 10, 2016, and U.S. patent application Ser. No. 15/252,916 filed Aug. 31, 2016. Each patent application identified above is incorporated herein by reference in its entirety.

BACKGROUND

Technical Field

The present disclosure relates, in general, to aircraft operable to transition between a forward flight mode and a vertical takeoff and landing mode and, in particular, to tilting cross-flow fan systems mounted to the fuselage.

Description of Related Art

Fixed wing aircraft, such as airplanes, are capable of flight using wings that generate lift responsive to the forward airspeed of the aircraft, which is generated by thrust from one or more jet engines or propellers. The wings generally have an airfoil cross section that generates the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward, and lateral flight. These attributes make helicopters highly versatile for use in congested, isolated or remote areas. Helicopters, however, typically lack the forward airspeed of fixed-wing aircraft due to the phenomenon of retreating blade stall and advancing blade compression.

Tiltrotor aircraft attempt to overcome this drawback by including a set of proprotors that can change their plane of rotation based on the operation being performed. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertically plane of rotation while cruising in forward flight, wherein the fixed wing provides lift and the proprotors provide forward thrust. In this manner, tiltrotor aircraft combine the vertical lift capability of a helicopter with the speed and range of fixed-wing aircraft. Tiltrotor aircraft, however, utilize openly exposed proprotors, which may present a number of drawbacks. For example, openly exposed proprotors can lead to blade tip thrust losses during flight, thrust vectoring capabilities are limiting and use of pressure differentials to augment thrust is limited.

Accordingly, the need has arisen for improved vertical takeoff and landing aircraft that have a reduced noise signature, a reduced impact risk and a reduced profile drag.

SUMMARY

In a first aspect, there is a variable thrust cross-flow fan system for an aircraft including a rotatable wing member having a first housing member, the first housing member having an intake region, an exhaust region, and a fan region between the intake region and the exhaust region; an actuator assembly operably coupled to the first housing member; and a variable thrust cross-flow fan assembly disposed within the fan region of the rotatable wing member, the variable thrust cross-flow fan assembly having a longitudinal axis and including a first and second driver plates having a plurality of blades rotatably mounted therebetween. The plurality of blades is disposed radially outwardly from the longitudinal axis such that the plurality of blades has a generally circular path of travel when the cross-flow fan assembly rotates about the longitudinal axis, the plurality of blades moveable between a plurality of pitch angle configurations. The variable thrust cross-flow fan assembly further includes a control assembly coupled to the plurality of blades operable to change the pitch angle configuration of the plurality of blades to generate a variable thrust force, and has a control cam that is substantially non-rotatable relative to the first and second driver plates, and a hinge member that is fixedly connected to the control cam and to the first housing member at a hinge axis. Rotation of the first housing member by the actuator assembly can impart rotation of the control cam about the hinge axis, thereby changing the direction of the variable thrust force.

In an embodiment, the first housing member can include an extended portion in the fan region configured to be fixedly connected to the hinge member.

In one embodiment, the control assembly can include a plurality of linkages, the control cam coupled to the plurality of blades by the plurality of linkages wherein each of the plurality of linkages has an inner end and an outer end, the inner end of each of the plurality of linkages slidably coupled to the control cam, the outer end of each of the plurality of linkages fixedly coupled to one of the plurality of blades.

In an embodiment, the control cam forms at least one follower slot such where the inner end of each of the plurality of linkages includes a follower pin; and the follower pin of each of the plurality of linkages is slidably engaged with the at least one follower slot.

In still another embodiment, the control cam forms a continuous follower slot where the inner end of each of the plurality of linkages includes a follower pin; and the follower pin of each of the plurality of linkages is slidably engaged with the continuous follower slot.

In yet another embodiment, the plurality of pitch angle configurations includes at least one right thrust configuration, a neutral configuration and at least one left thrust configuration.

In still another embodiment, the plurality of pitch angle configurations includes at least one upward thrust configuration, a neutral configuration and at least one downward thrust configuration.

In an embodiment, the plurality of pitch angle configurations includes pitch angle configurations wherein each of the plurality of blades changes pitch angle during each revolution around the generally circular path of travel.

In one embodiment, the plurality of pitch angle configurations includes pitch angle configurations wherein each of the plurality of blades fluctuates between a positive pitch angle and a negative pitch angle during each revolution around the generally circular path of travel.

In another embodiment, the plurality of pitch angle configurations includes pitch angle configurations wherein one or more blades of the plurality of blades has the negative pitch angle while one or more blades of the plurality of blades has the positive pitch angle.

In yet another embodiment, the variable thrust is a reversible thrust.

In still another embodiment, the control assembly is operable to change the pitch angle configuration of the plurality of blades to selectively generate thrust in a plurality of directions including a first direction and a second direction, the first direction substantially opposite from the second direction.

In an embodiment, the rotatable wing member further includes a second housing member, the second member having an intake region, an exhaust region, and a fan region between the intake region and the exhaust region.

In one embodiment, the variable thrust cross-flow fan assembly is disposed between the first housing member and the second housing member.

In still another embodiment, the first housing member and the second housing member are interconnected.

In an embodiment, the direction of the thrust is generally parallel to the chord axis.

An embodiment provides that the direction of the thrust is an anti-torque thrust.

In one embodiment, the actuator assembly includes at least one of the following: a linear actuator; and a rotary actuator.

In a second aspect, there is provided an aircraft including a fuselage having a forward and an aft portion; and at least one variable thrust cross-flow fan system disposed on the fuselage. The variable thrust cross-flow fan system includes a rotatable wing member having a first housing member, the first housing member having an intake region, an exhaust region, and a fan region between the intake region and the exhaust region; an actuator assembly operably coupled to the first housing member; and a variable thrust cross-flow fan assembly disposed within the fan region of the rotatable wing member. The variable thrust cross-flow fan assembly having a longitudinal axis and including a first and second driver plates having a plurality of blades rotatably mounted therebetween, the plurality of blades disposed radially outwardly from the longitudinal axis such that the plurality of blades has a generally circular path of travel when the cross-flow fan assembly rotates about the longitudinal axis, the plurality of blades moveable between a plurality of pitch angle configurations and a control assembly. The control assembly can be coupled to the plurality of blades operable to change the pitch angle configuration of the plurality of blades to generate a variable thrust force and can include a control cam that is substantially non-rotatable relative to the first and second driver plates, and a hinge member that is fixedly connected to the control cam and to the first housing member at a hinge axis; wherein rotation of the first housing member by the actuator assembly imparts rotation of the control cam about the hinge axis, thereby changing the direction of the variable thrust force.

In an embodiment, the at least one variable thrust cross-flow fan system is rotatably attached to a forward portion of the fuselage.

In one embodiment, the at least one variable thrust cross-flow fan system is rotatably attached to an aft portion of the fuselage.

In a third aspect, there is provided a method of directing the thrust of a variable cross flow fan system including the steps of providing an aircraft having at least one variable thrust cross-flow fan system disposed on the fuselage including a rotatable wing member having a first housing member, the first housing member having an intake region, an exhaust region, and a fan region between the intake region and the exhaust region; an actuator assembly operably coupled to the first housing member; and a variable thrust cross-flow fan assembly disposed within the fan region of the rotatable wing member; and rotating the wing member by the actuator assembly to impart rotation of a control cam about a hinge axis to change the direction of the variable thrust force. The variable thrust cross-flow fan assembly having a longitudinal axis and including a first and second driver plates having a plurality of blades rotatably mounted therebetween, the plurality of blades disposed radially outwardly from the longitudinal axis such that the plurality of blades has a generally circular path of travel when the cross-flow fan assembly rotates about the longitudinal axis, the plurality of blades moveable between a plurality of pitch angle configurations, a control assembly coupled to the plurality of blades operable to change the pitch angle configuration of the plurality of blades to generate a variable thrust force, the control assembly includes the control cam that is substantially non-rotatable relative to the first and second driver plates, and hinge member that is fixedly connected to the control cam and to the first housing member at the hinge axis.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 3A-3F are schematic illustrations of a tilting cross-flow fan aircraft in vertical flight mode in accordance with exemplary embodiments of the present disclosure;

FIGS. 10A-10E are schematic illustrations of the blades of a variable thrust cross-flow fan assembly producing variable thrust in vertical flight mode in accordance with exemplary embodiments of the present disclosure;

FIG. 13 is an isometric view of a variable thrust cross-flow fan assembly in accordance with exemplary embodiments of the present disclosure;

DESCRIPTION OF THE PREFERRED EMBODIMENT

Figure 1A:
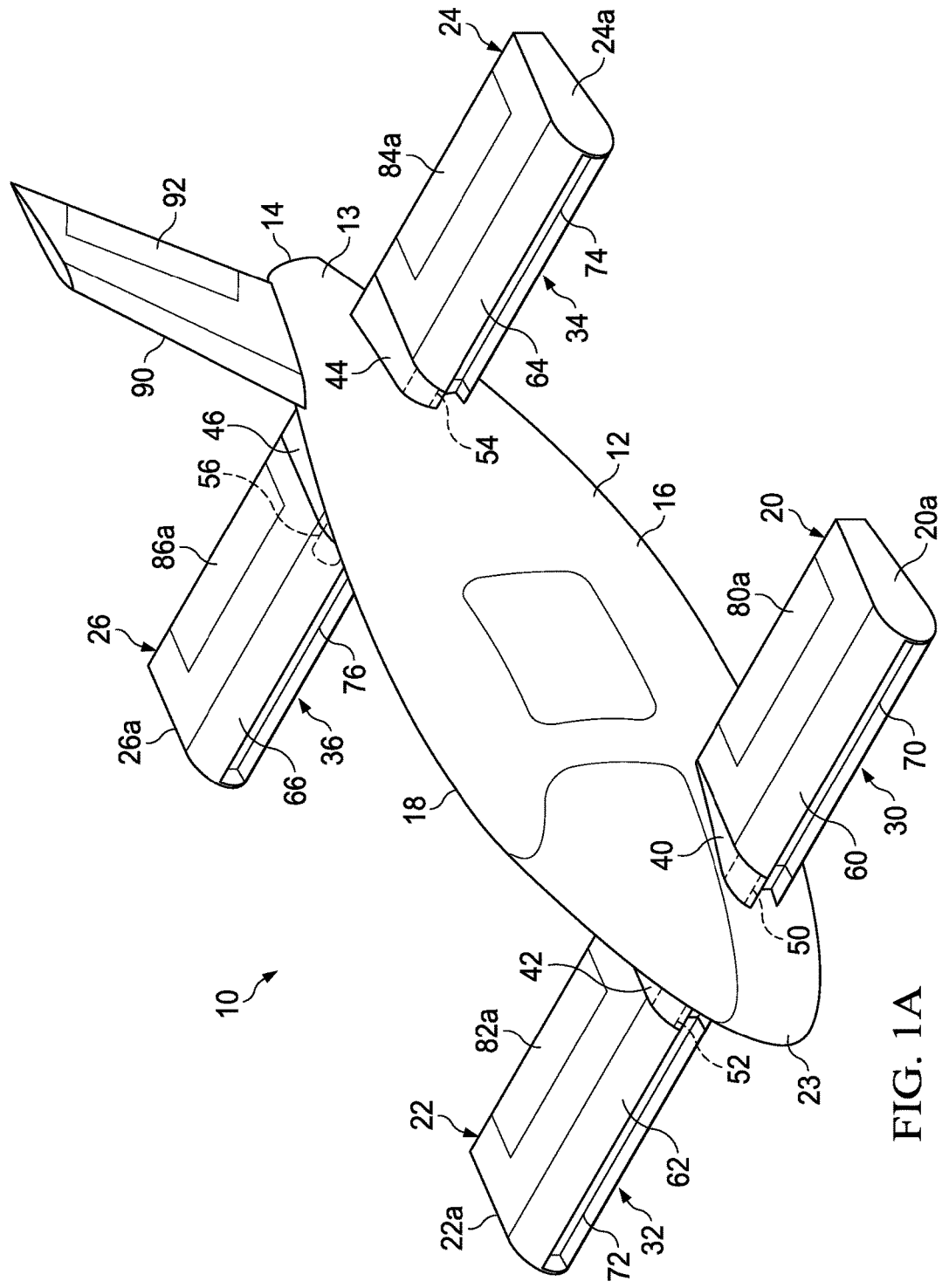
FIGS. 1A-1C are schematic illustrations of a tilting cross-flow fan aircraft in forward flight mode, transition mode, and vertical flight mode in accordance with exemplary embodiments of the present disclosure.

Illustrative embodiments of the apparatus and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIGS. 1A-1C, 2A-2F, 3A-3F, and 4A-4C in the drawings, a tilting cross-flow fan aircraft is schematically illustrated and generally designed 10. Aircraft 10 includes a fuselage 12. Fuselage 12 has an aft portion 13 from which an abbreviated tailboom 14 extends in the aft direction. Aircraft 10 has a left side 16 and a right side 18. As used herein, the terms "left" and "right," unless otherwise indicated, refer to the port and starboard sides of the aircraft, respectively. Aircraft 10 includes a forward wing 20 and a forward wing 22, each of which extends from a forward portion 23 of fuselage 12. Aircraft 10 includes an aft wing 24 and an aft wing 26, each of which extends from the aft portion 13 of fuselage 12.

It should be appreciated that aircraft 10 is merely illustrative of a variety of aircraft that can implement the embodiments disclosed herein. Other aircraft implementations can include hybrid aircraft, tilt rotor aircraft, unmanned aircraft, gyrocopters and a variety of helicopter configurations, to name a few examples. The illustrative embodiments may also be used on airplanes.

A first cross-flow fan system 30 is rotatably attached to left side 16 of the forward portion 23 of fuselage 12. A second cross-flow fan system 32 is rotatably attached to right side of the 18 of the forward portion 23 of fuselage 12. A third cross-flow fan system 34 is rotatably attached to the left side 16 of the aft portion 13 of the fuselage 12. A fourth cross-flow fan system 36 is rotatably attached to the right side 18 of the aft portion 13 of the fuselage 12. Each cross-flow fan system 30, 32, 34, 36 forms part of the respective forward wings 20, 22 and the aft wings 24, 26 and is located at the respective distal end 20a, 22a, 24a, and 26a thereof. First and second cross-flow fan systems 30, 32 are supported by forward portions 40, 42 of the fuselage 12. Third and fourth cross-flow fan systems 34, 36 are supported by aft portions 44, 46 of the fuselage 12. As used herein, the term "coupled" may include direct or indirect coupling by any means, including moving and non-moving mechanical connections. In one embodiment, forward drive shafts 50, 52 and aft drive shafts 54, 56 are mechanically coupled to forward fan cross-flow fan systems 30, 32 and aft cross-flow fan systems 34, 36, respectively.

Each first, second, third, and fourth cross-flow fan system 30, 32, 34, 36 includes a wing member 60, 62, 64, 66 that partially encloses, supports, and protects a first, second, third, and fourth variable thrust cross-flow fan assembly 70, 72, 74, 76 extending along the longitudinal axis thereof. Each of the wing members 60, 62, 64, 66 includes a first housing member 60a, 62a, 64a, 66a and a second housing member 60b, 62b, 64b, 66b and has an overall shape sufficient to act as a wing surface. Each of the first housing members and second housing members 60a-60b, 62a-62b, 64a-64b, and 66a-b includes an exterior aerodynamic surface 60c-60d, 62c-62d, 64c-64d, 66c-66d and a guiding surface 60e-60f, 62e-62f, 64e-64f, 66e-66f. The exterior aerodynamic surfaces 60c-d, 62c-d, 64c-d, 66c-d of wing members 60, 62, 64, 66 provide lift for the respective forward wings 20, 22, and aft wings 24, 26 during forward flight mode. Each of the exterior aerodynamic surfaces 60c-60d, 62c-62d, 64c-64d, 66c-66d can include flaps 80a-b, 82a-b, 84a-b, 86a-b movably mounted thereon.

Cross-flow fan systems 30, 32, 34, 36 are collectively powered and manipulated to selectively control direction, thrust, and lift of aircraft 10. The cross-flow fan systems 30, 32, 34, 36 are each tiltable relative to fuselage 12, between a horizontal position in forward flight mode and vertical position during hover or vertical flight modes. Each of the first, second, third and fourth cross-flow fan systems 30, 32, 34, 36 are each rotatable about an axis generally perpendicular to the longitudinal axis of the fuselage.

Vertical takeoff and landing mode may be considered to include hover operations of aircraft 10. The cross-flow fan systems 30, 32, 34, 36 may be tilted between the horizontal and vertical positions by a rotatable drive shaft extending through the wings 20, 22, 24, 26, and which are rotatable in response to commands originating form a pilot or from elsewhere. In an embodiment, the cross-flow fan systems 30, 32, 34, 36 each may be rotated by an actuator assembly that can be a linear actuator, a rotary actuator, or still another type of actuator device connected to the drive shaft. The actuator device may be powered hydraulically, electrically, or still otherwise powered.

Figure 1B:
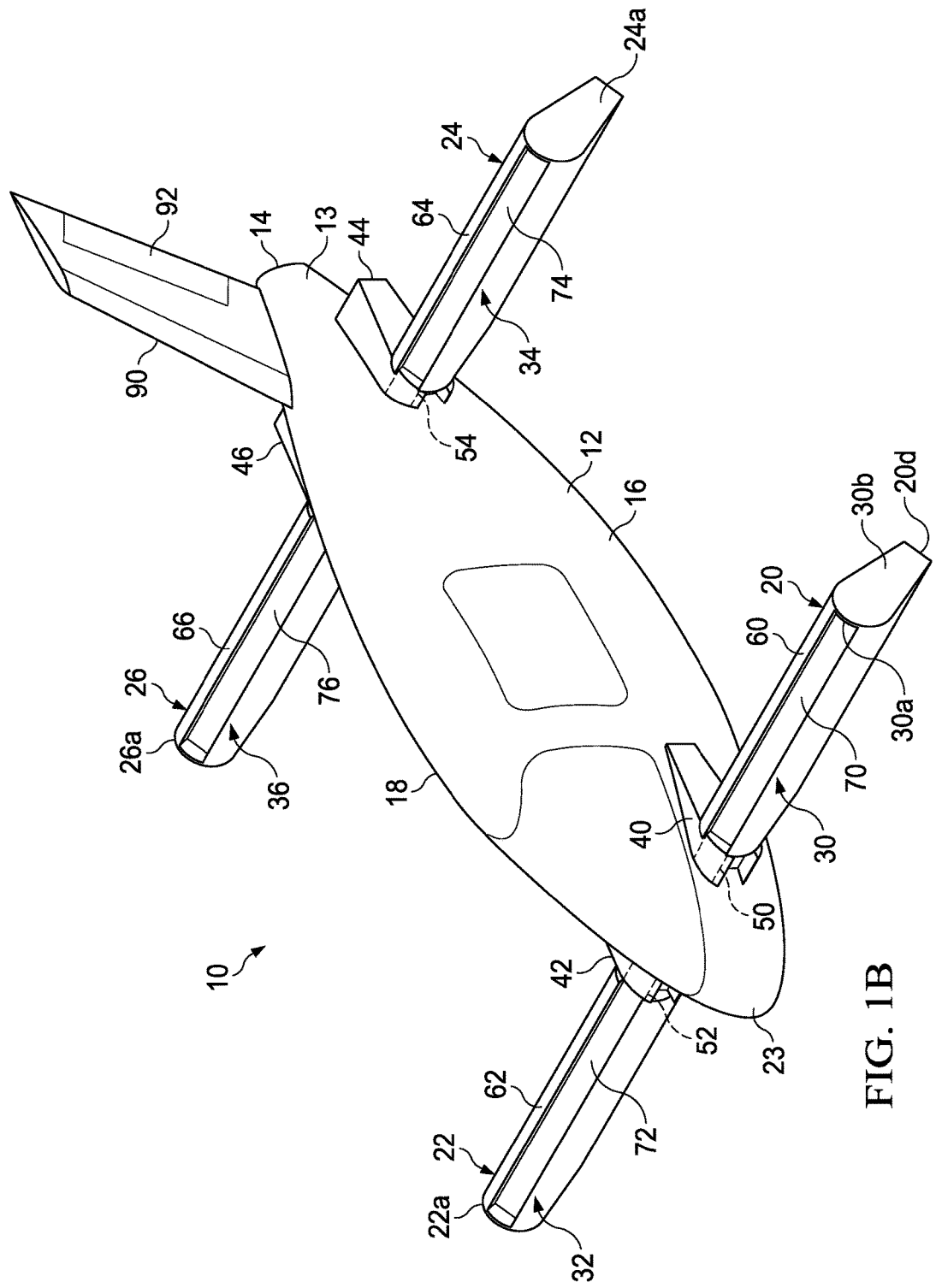
Figure 1C:
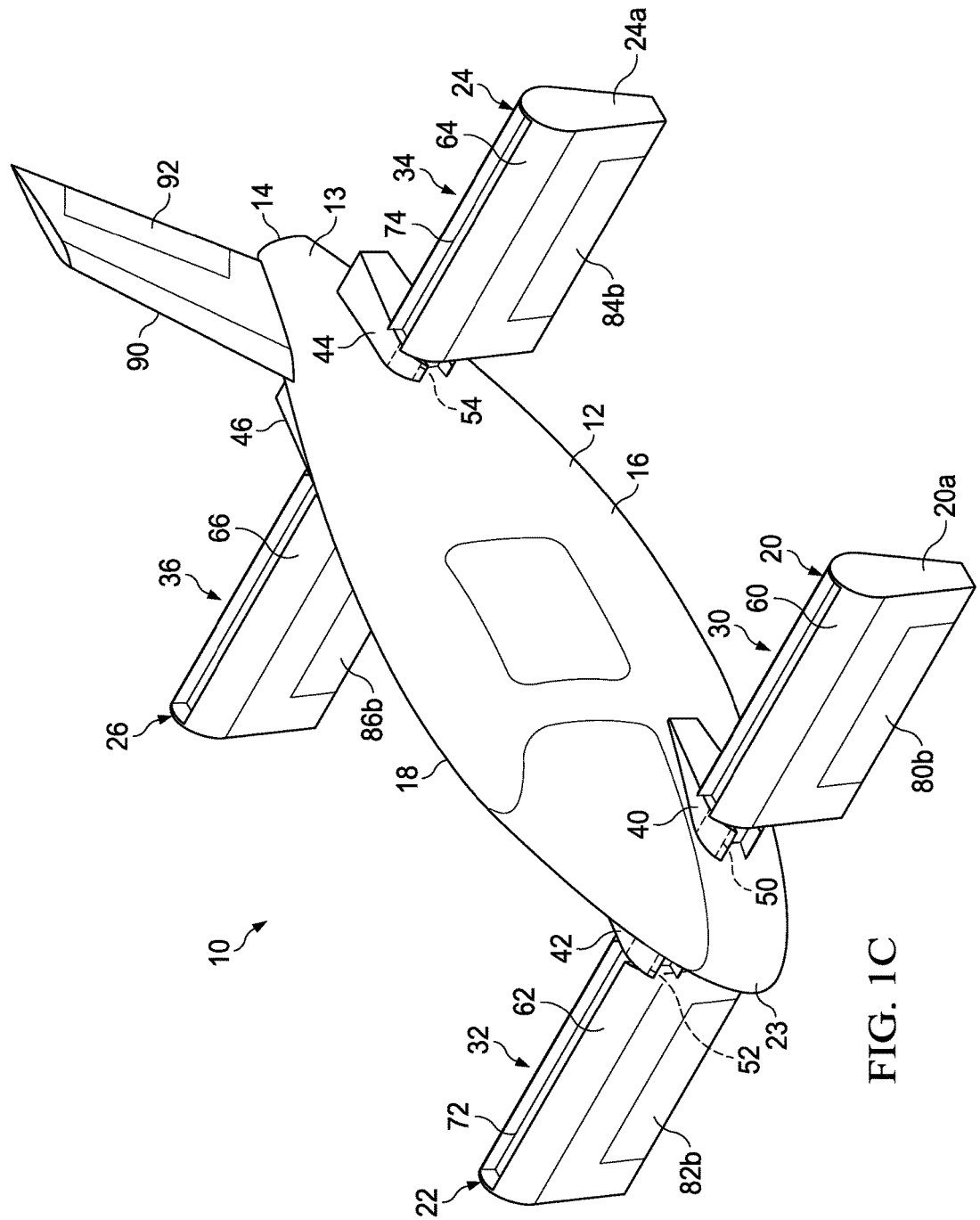
Figure 2A:
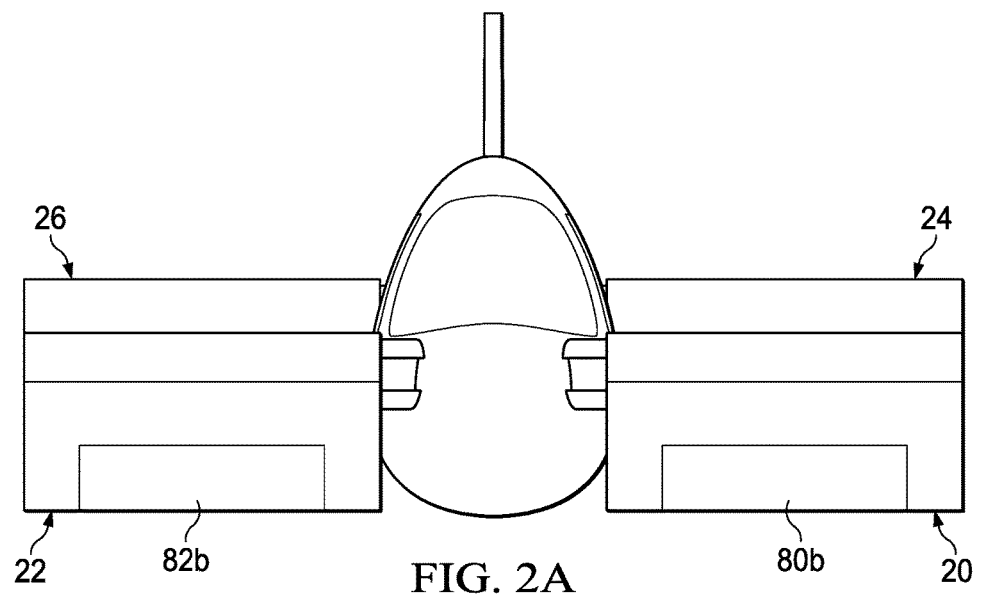
FIGS. 2A-2B are schematic front view illustrations of a tilting cross-flow fan aircraft in vertical flight mode and forward flight mode in accordance with exemplary embodiments of the present disclosure.
Figure 2B:
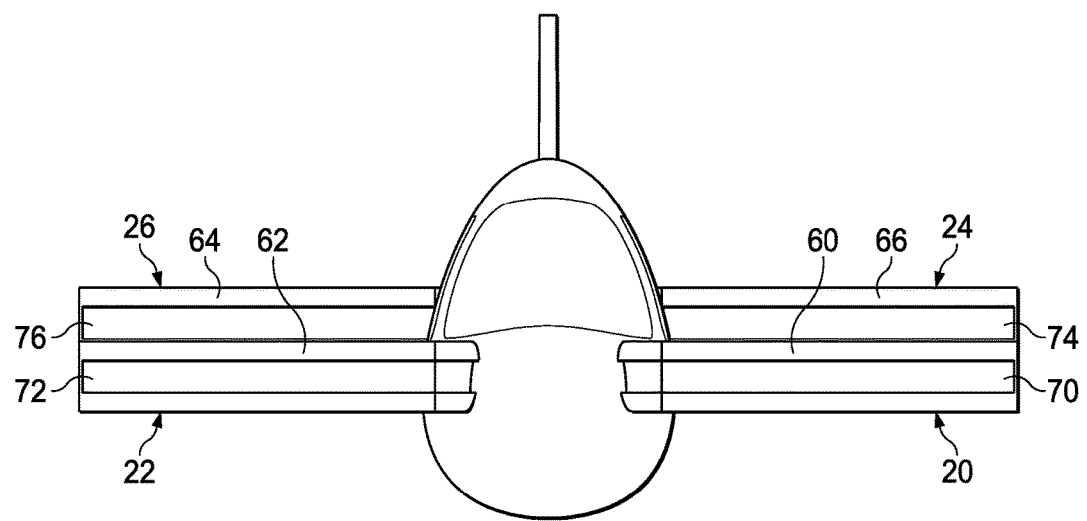
Figure 2C:
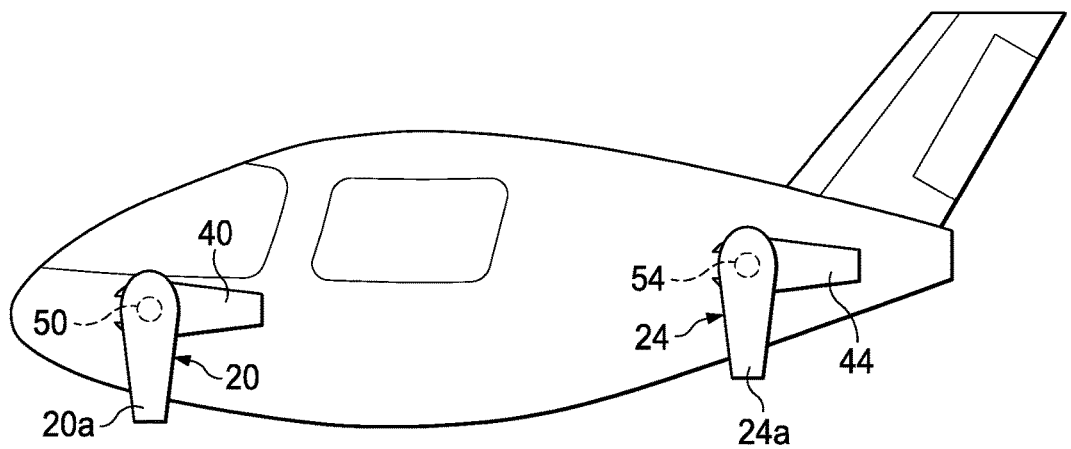
FIGS. 2C-2D are schematic side view illustrations of a tilting cross-flow fan aircraft in vertical flight mode and forward flight mode in accordance with exemplary embodiments of the present disclosure.
Figure 2D:
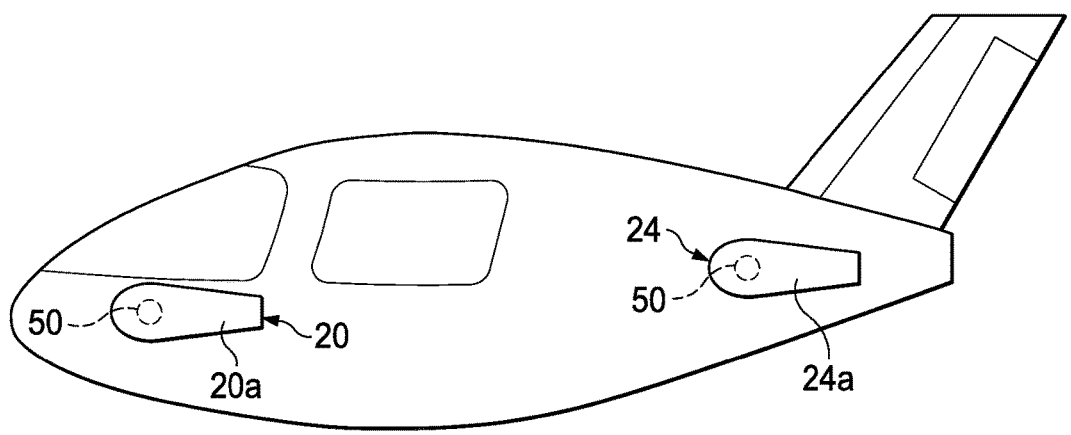
Figure 2E:
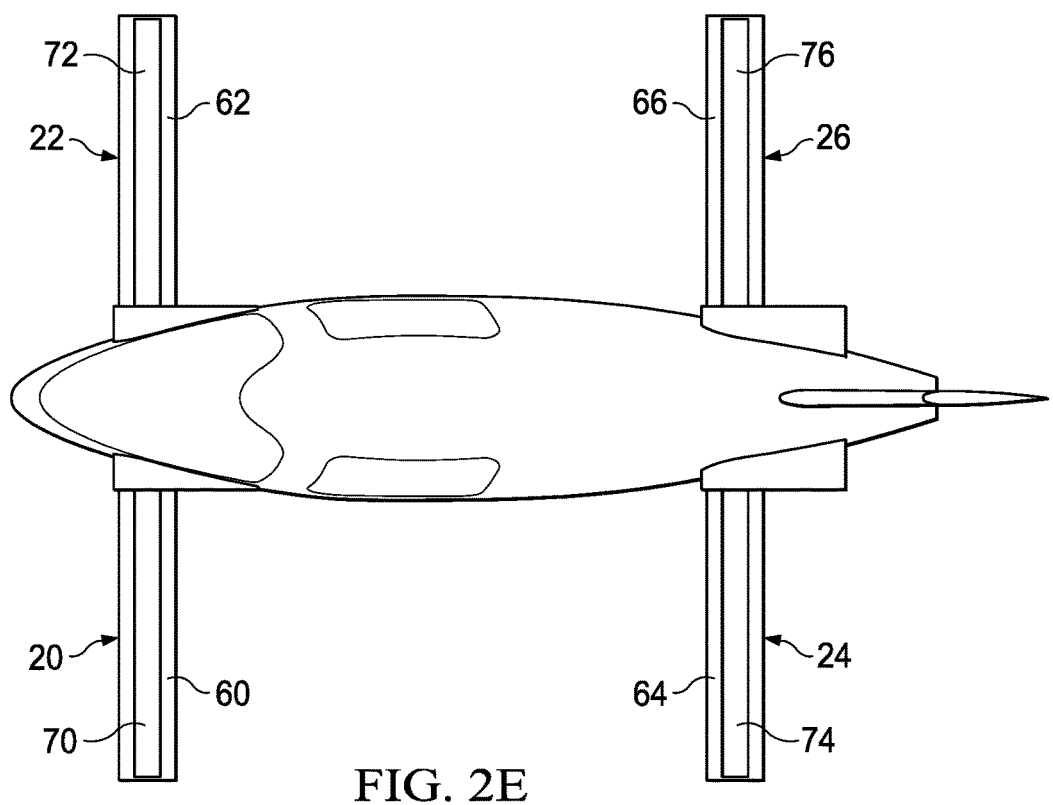
FIGS. 2E-2F are schematic top view illustrations of a tilting cross-flow fan aircraft in vertical flight mode and forward flight mode in accordance with exemplary embodiments of the present disclosure.
Figure 2F:
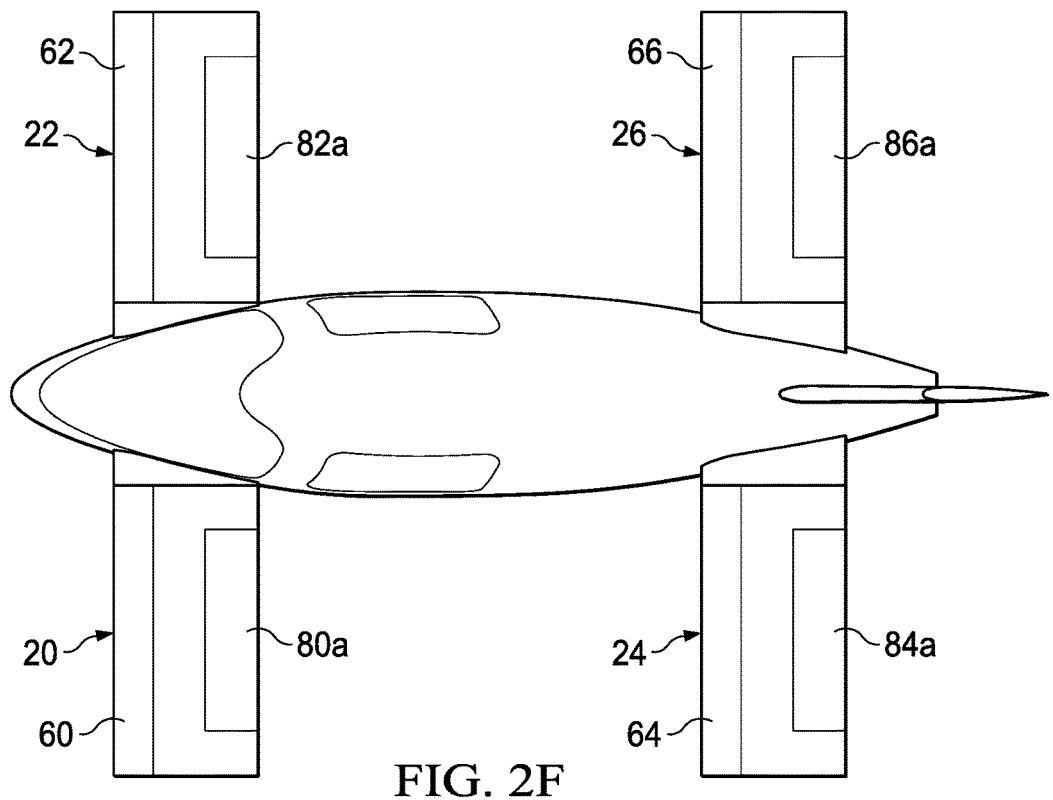

As shown in FIGS. 1A, 2B, 2D, and 2F, the cross-flow fan systems 30, 32, 34, 36 are positioned generally horizontally so the exhaust is aft of the wing 20, 22, 24, 26 in forward flight mode. The cross-flow fan systems 30, 32, 34, 36 can provide thrust and lift in forward flight mode; thrust and lift in the transition mode, as shown in FIG. 1B; and vertical lift when in vertical flight modes, as shown in FIGS. 1C, 2A, 2C, and 2E. In vertical lift mode, the cross-flow fan systems 30, 32, 34, 36 are positioned generally vertically so the exhaust is pointed downward.

In vertical flight modes, as shown in FIGS. 3A-3F, the aircraft 10 is operable to fly in all directions during the vertical takeoff and landing mode although faster forward flight is generally achievable. The cross-flow fan systems 30, 32, 34, 36 may be independently controlled to adjust the angle, fan pitch, and rotational speed of each cross-flow fan system 30, 32, 34, 36 for a flight mode.

Figure 3A:
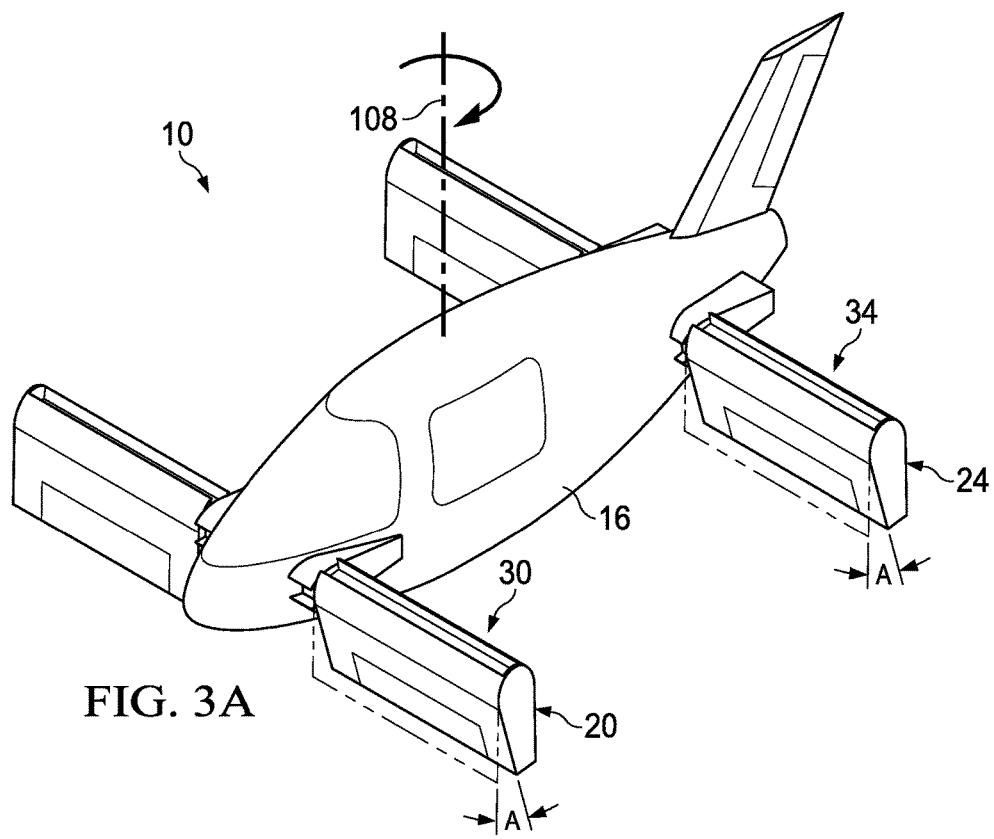
Figure 3B:
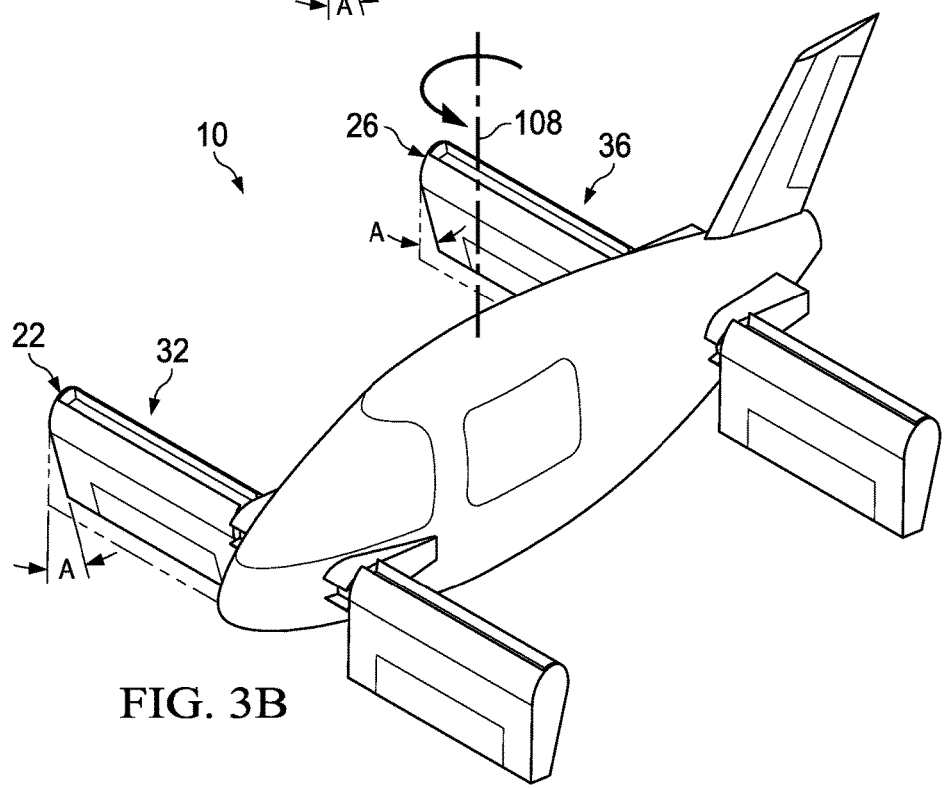

The aircraft 10 is configured to generate a yaw control by selectively differentiating a collective power in the first, second, third and fourth cross-flow fan systems 30, 32, 34, 36, in any combination so as to produce a desired differential in thrust angle between the left side 16 and right side 18 in vertical flight mode. For example, the thrust angle A of the cross-flow fan systems 30, 34 on the left side 16, as shown in FIG. 3A, or the cross-flow systems 32, 26 on the right side 18, as shown in FIG. 3B, can be adjusted to provide yaw control about axis 108 in vertical flight mode.

Figure 3C:
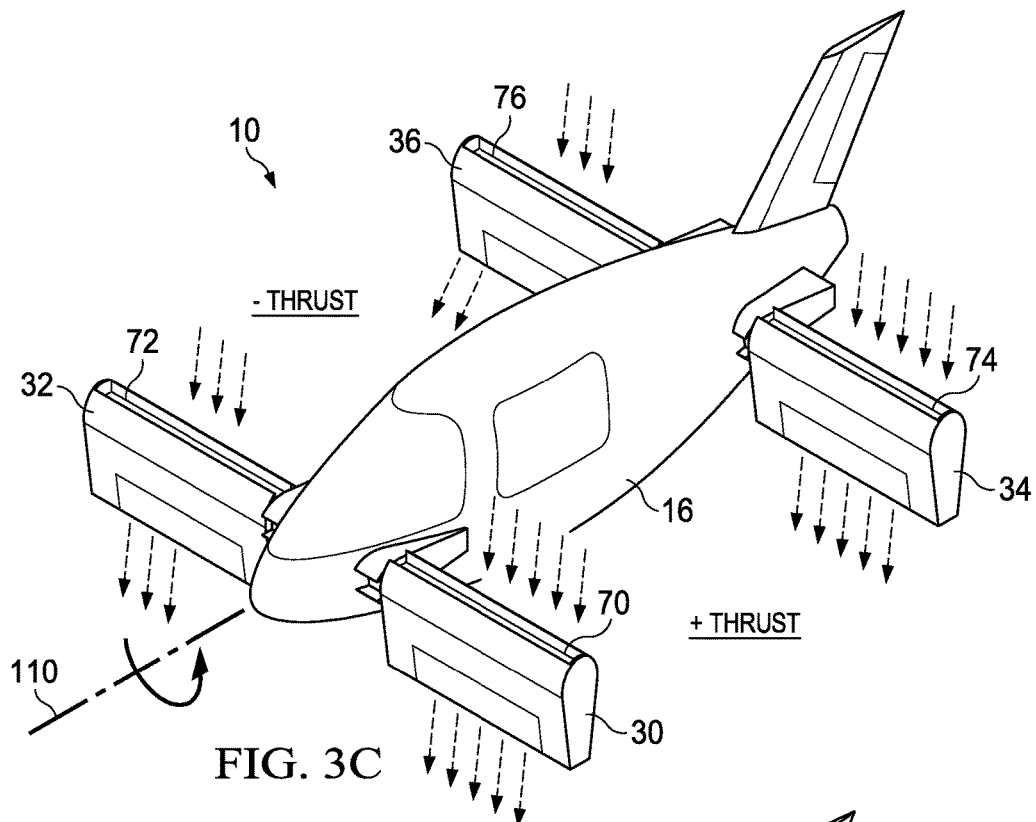
Figure 3D:
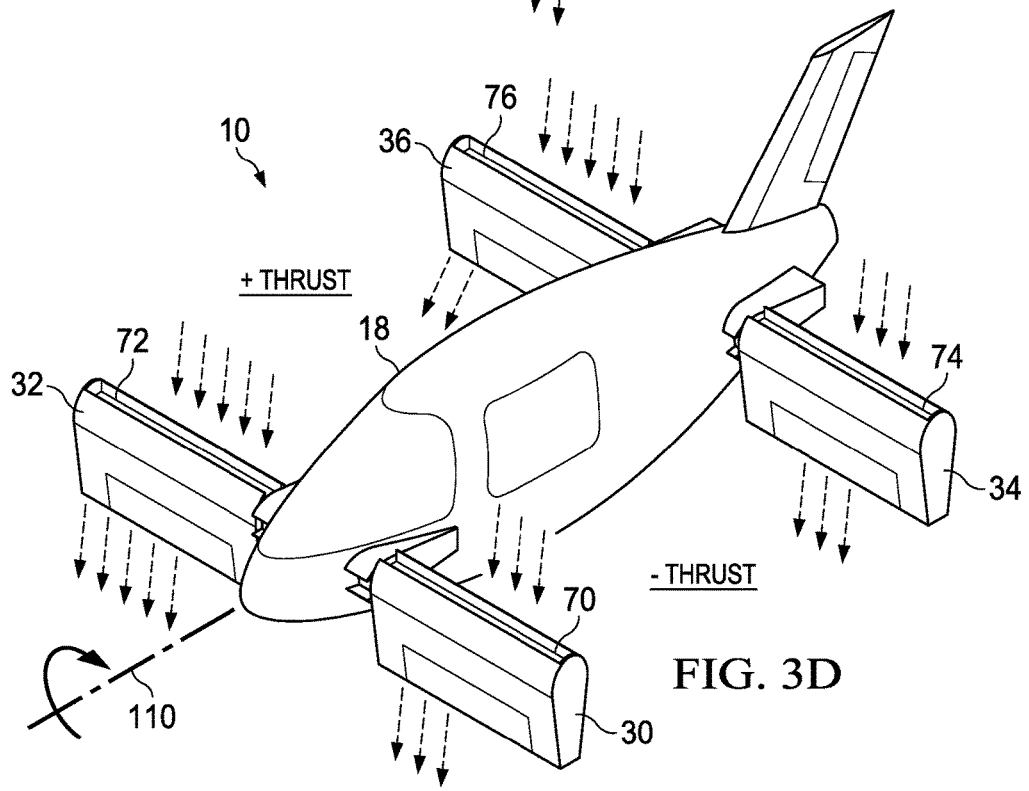

The aircraft 10 is also configured to generate a roll control by selectively differentiating a collective power in the first, second, third, and fourth cross-flow fan systems 30, 32, 34, 36 in any combination so as to produce a desired differential in thrust between the left side 16 and the right side 18 in vertical flight mode. The rotational speed and/or the fan pitch of the fan assemblies 70, 72 on the left side 16 or the fan assemblies 72, 76 on the right side 18 may be adjusted to increase or decrease thrust to provide roll control about axis 110 in vertical flight mode, as shown in FIGS. 3C-3D.

The aircraft 10 is further configured to generate a pitching control of the aircraft by selectively differentiating a collective power in the first, second, third, fourth cross-flow fan systems 30, 32, 34, 36 in any combination so as to produce a desired differential in thrust between the forward portion 23 and the aft portion 13 in vertical flight mode. As shown in FIGS. 3E-3F, the pitch control of the aircraft 10 about axis 112 in vertical flight mode is provided by adjusting the rotational speed and/or angle of the front fan assemblies 70, 72 or the aft fan assemblies 74, 76 to increase or decrease thrust respectively therein.

Figure 4A:
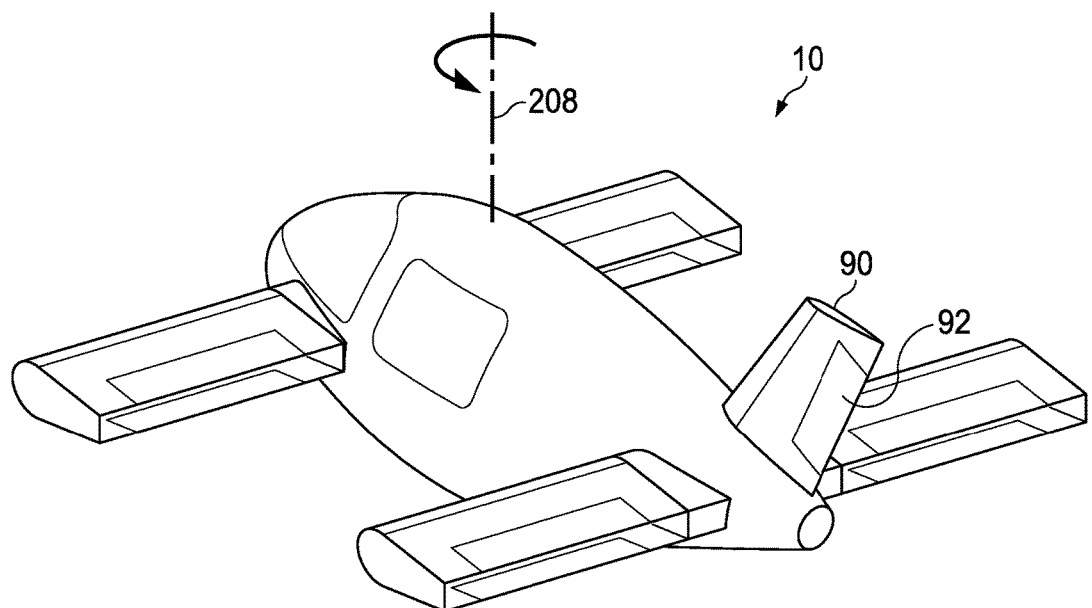
FIGS. 4A-4C are schematic illustrations of a tilting cross-flow fan aircraft in forward flight mode in accordance with exemplary embodiments of the present disclosure.
Figure 4B:
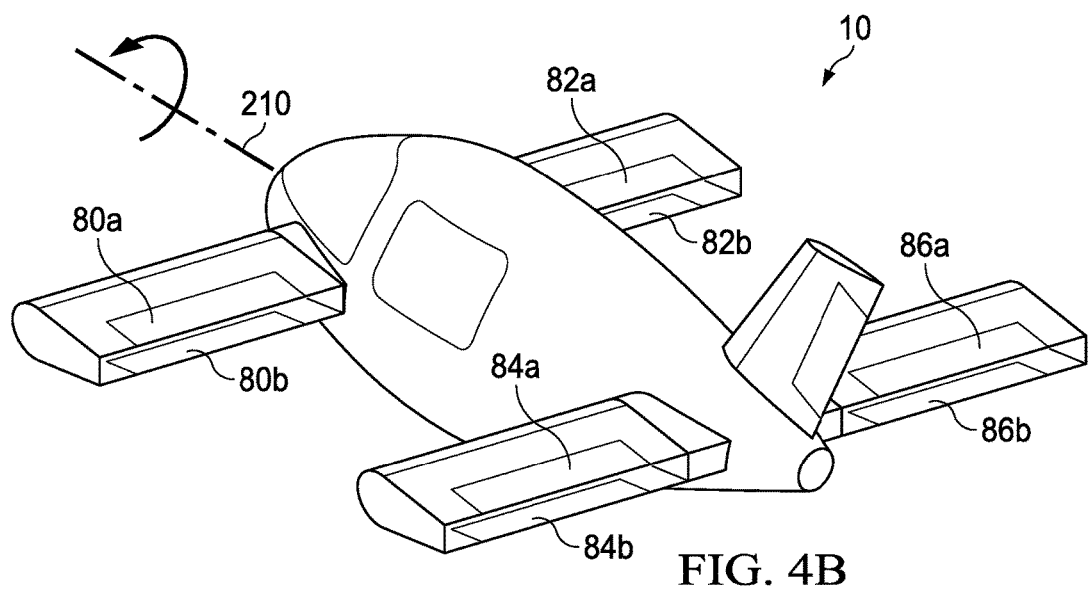
Figure 4C:
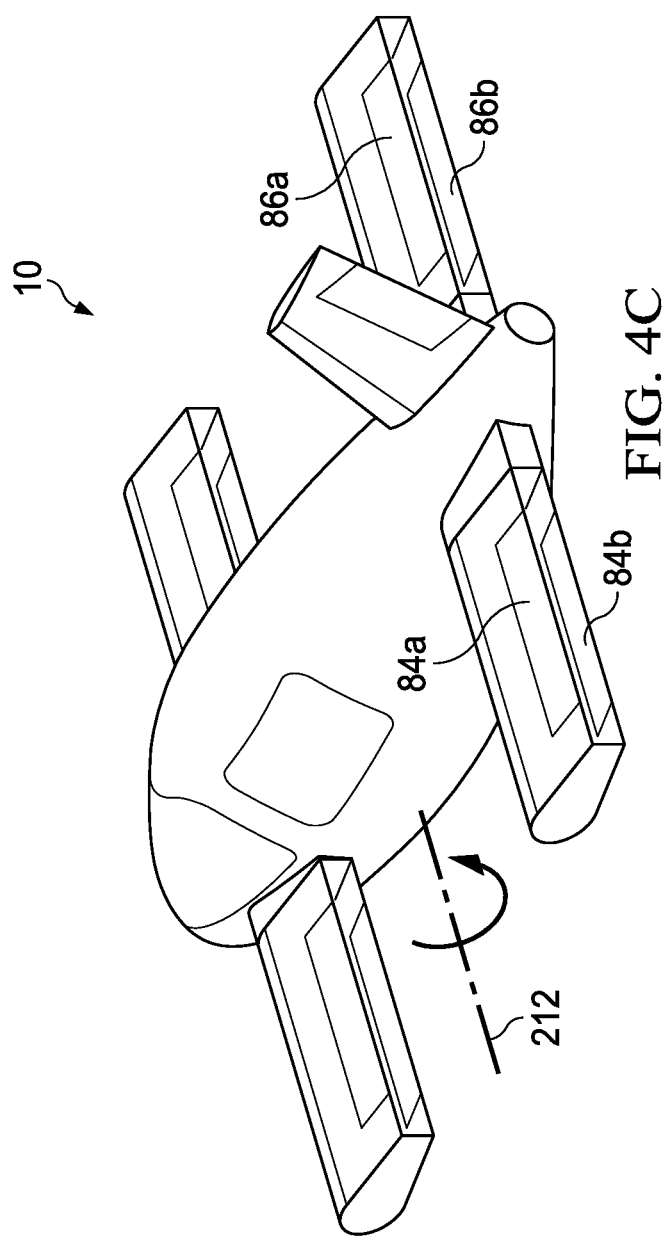

In forward flight mode shown in FIGS. 4A-4C, conventional yaw control about axis 208 is provided by a rudder 92 on a tail member 90, as shown in FIG. 4A. The aircraft 10 is configured to generate roll control in forward flight mode by actuating the flaps on the first, second, third, and fourth cross-flow fan systems 30, 32, 34, 36 in any combination so as to produce a desired differential of lift between the left and the right side of the aircraft. As shown in FIG. 4B, for example each of flaps 80a-b, 82a-b, 84a-b, 86a-b; only the forward flaps 80a-b, 82a-b; or only the aft flaps 84a-b, 86a-b may be raised or lowered to provide roll control about axis 210 in vertical flight mode as shown in FIG. 4B.

The aircraft 10 is further configured to generate a pitching control in forward flight by actuating the flaps on the third and fourth cross-flow fan systems 34, 36 in any combination so as to produce a desired differential of lift between the forward portion 23 and the aft portion 13. For example, the aft flaps 84a-b, 86a-b can be raised or lowered to provide pitch control about axis 212 as shown in FIG. 4C.

Figure 5A:
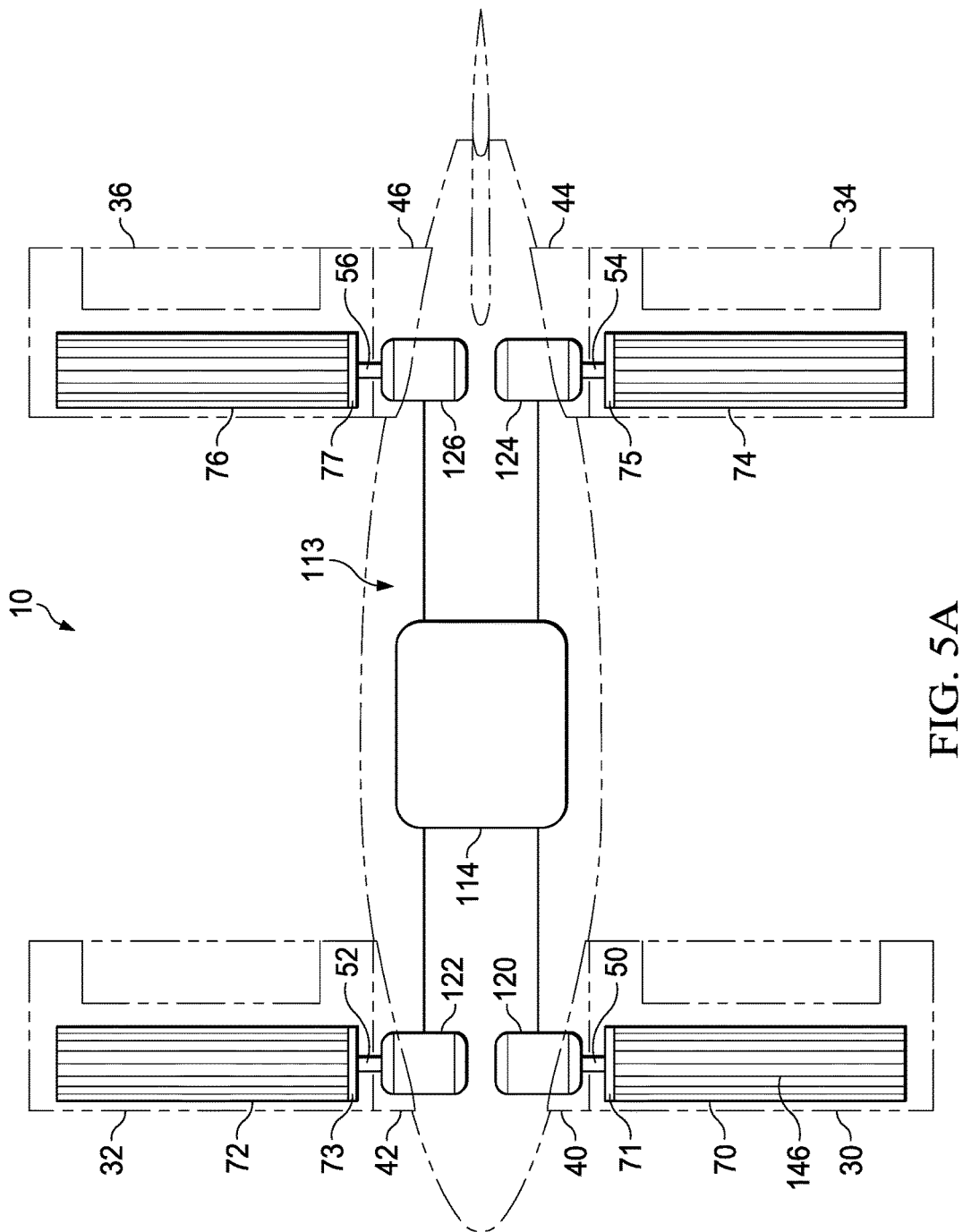
FIGS. 5A-5D are schematic illustrations of power sources for a tilting cross-flow fan aircraft in accordance with exemplary embodiments of the present disclosure.

Aircraft 10 includes a drive system 113, which includes a power source 114 and a motor 120, 122, 124, 126 associated with each drive shaft 50, 52, 54, 56. The power source 114 is located in fuselage 12 and is operably connected to each of the motors 120, 122, 124, 126. Each of the motors 120, 122, 124, 126 is located at least partially in the fuselage 12 and in the respective forward and aft portions 40, 42, 44, 46. In an embodiment shown in FIG. 5A the drive system 113 is a distributed electric propulsion system having a battery as the power source 114 connected to electric motors 120, 122, 124, 126. Each of the electric motors 120, 122, 124, 126 provides torque and rotational energy to the drive shafts 50, 52, 54, 56. The drive shafts 50, 52, 54, 56 are each mechanically coupled to the respective cross-flow fan system 30, 32, 34, 36 including the cross-flow fan assemblies 70, 72, 74, and 76 and flaps 80a-b, 82a-b, 84a-b, 86a-b. Each drive shaft 50, 52, 54, 56 may be a single long shaft or a series of shorter shafts and may preferably having flexible couplings to allow flexure. The cross-flow fan assemblies 70, 72, 74, 76 each includes an actuator assembly 71, 73, 75, 77.

Figure 5B:
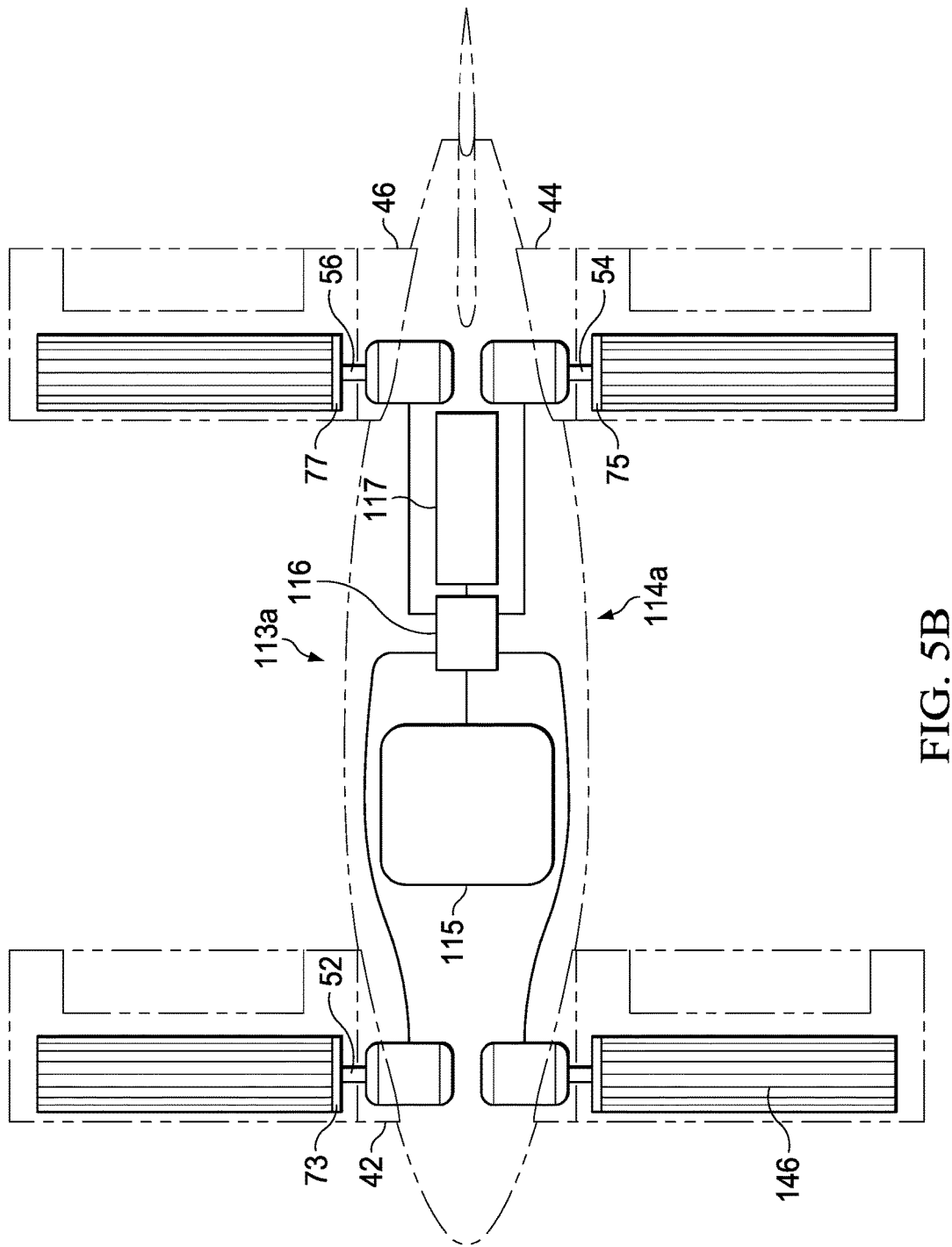

In another embodiment shown in FIG. 5B, the drive system 113a has a power source 114a including a battery 115, a generator 116, and a combustion engine 117. The power source 114a provides electrical power to electric motors 120, 122, 124, 126.

Figure 5C:
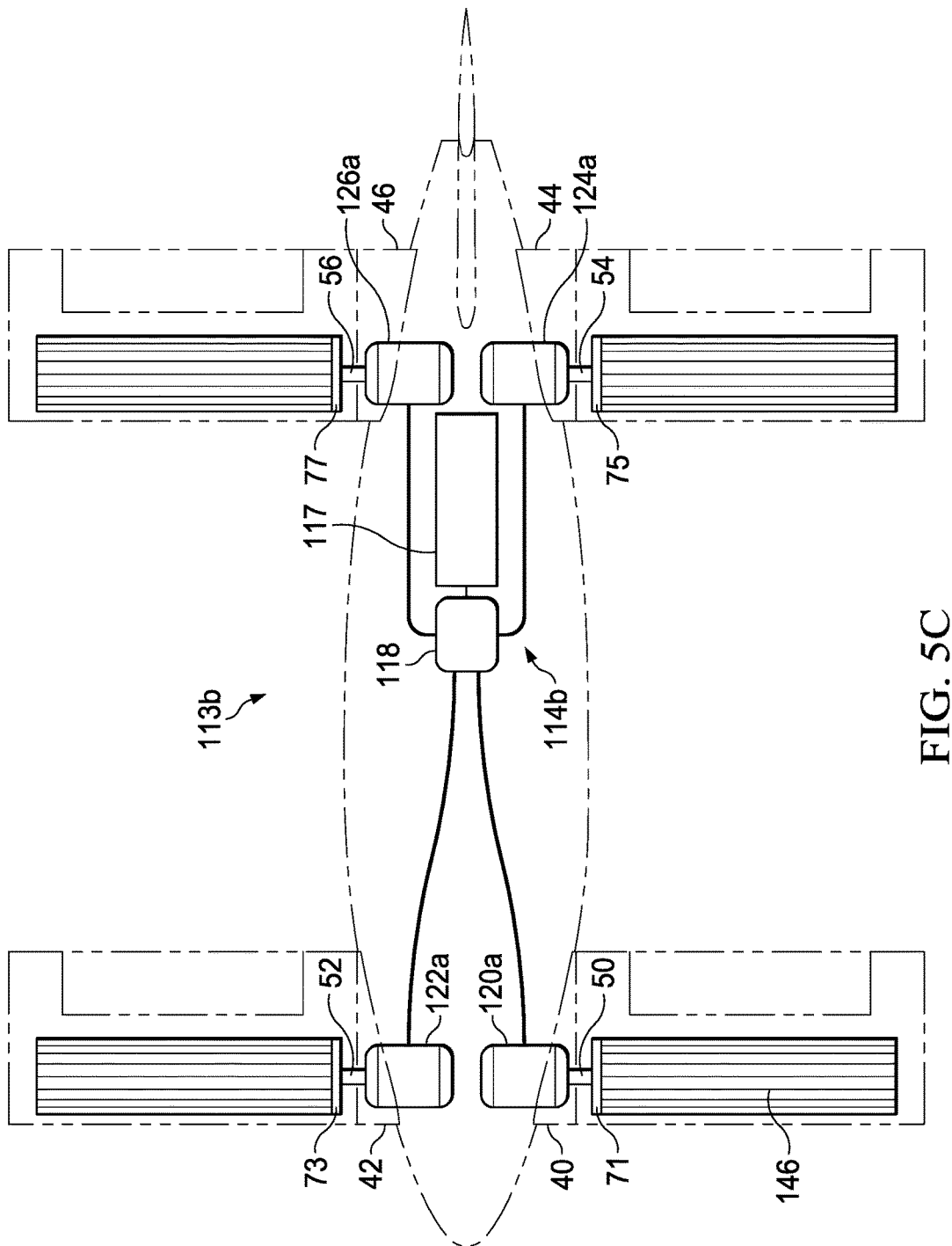
Figure 5D:
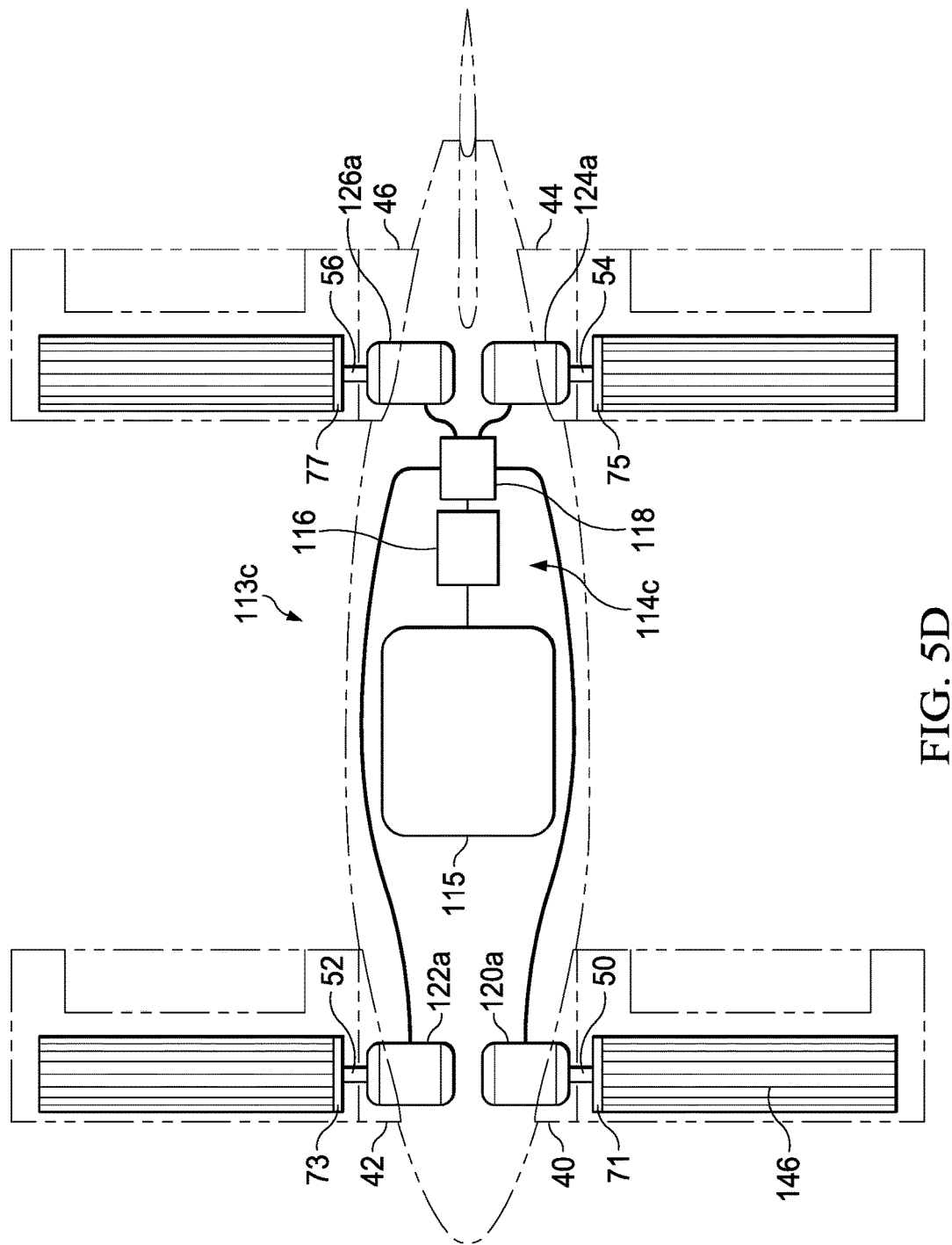
Figure 6:
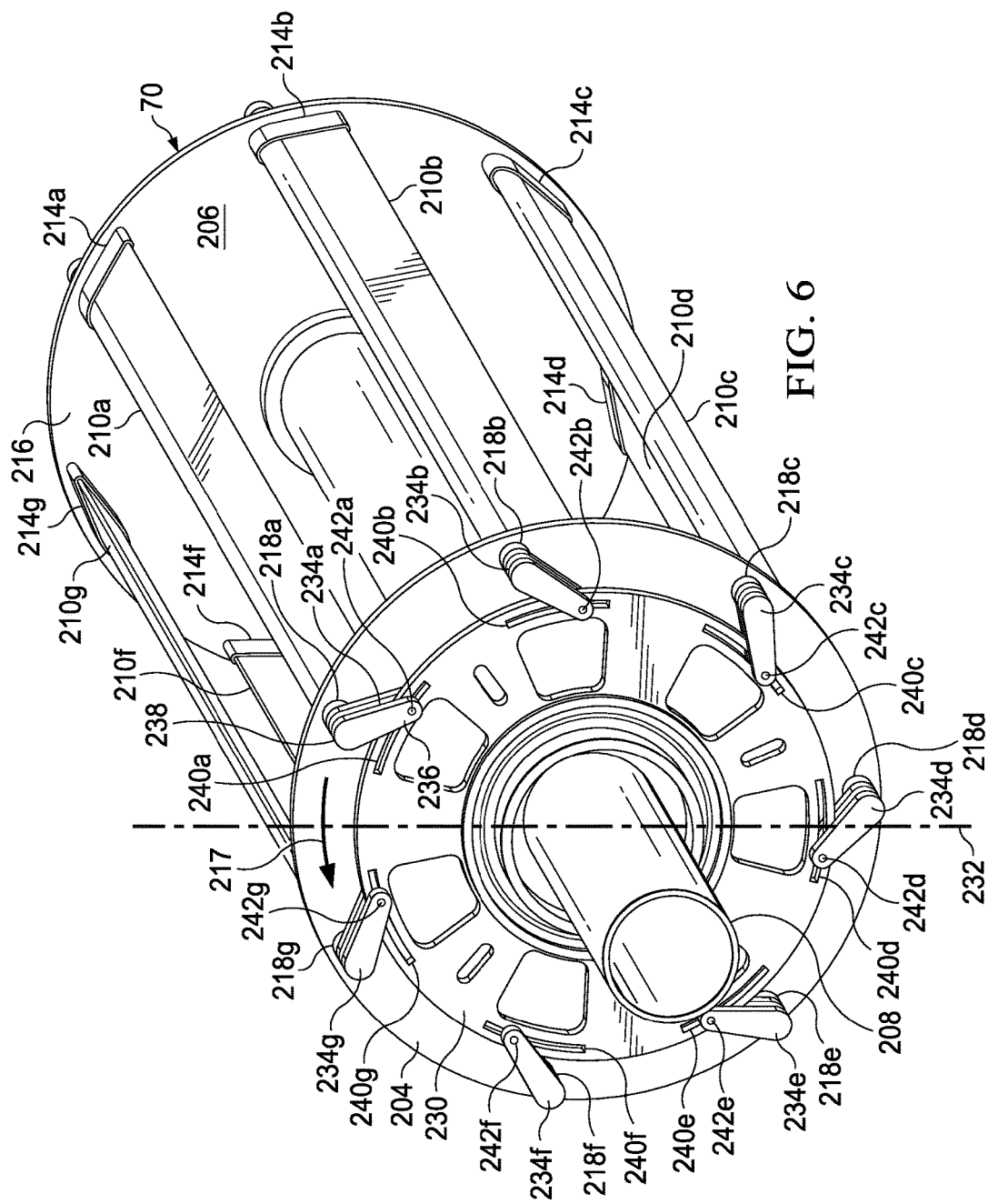
FIG. 6 is an isometric view of a variable thrust cross-flow fan assembly in accordance with embodiments of the present disclosure.

FIG. 5C illustrates an embodiment of the drive system 113b having a power source 114b including a combustion engine 117 for powering a hydraulic pump 118. In one embodiment, shown in FIG. 5D, the drive system 113c has a power source 114c that includes a battery 115 and a generator 116 for powering a hydraulic pump 118. The hydraulic pump 118 is operably connected to hydraulic motors 120a, 122a, 124a, 126a.

The cross-flow fan system 30 is representative of the cross-flow fan systems 32, 34, 36; therefore, for the sake of efficiency certain features will only be described with regard to the cross-flow fan system 30. However, one of ordinary skill in the art would fully appreciate an understanding of the cross-flow fan systems 32, 34, 36 based on the disclosure herein of the cross-flow fan system 30. The cross-flow fan system 30 includes a leading edge 30*a* and a trailing edge 30*b* that define a chordwise axis therebetween.

The cross-flow fan system 30 can include a variable thrust cross-flow fan assembly 70 that generates a multi-directional, including bi-directional, and variable intensity thrust around a longitudinal axis of the drive shaft 50. In an embodiment, the thrust or anti-torque from the variable cross-flow fan assembly 70 is oriented along the chordwise axis of the cross-flow fan system 30. The variable thrust cross-flow fan assembly 70 has a plurality of blades 146 that are rotated in response to the rotation of drive shaft 50. It is contemplated that the variable thrust cross-flow fan assembly 70 could be configured using a variety of mechanical features and components achieving similar operational requirements, accordingly, the following embodiments are provided as examples of a few of those configurations.

In one embodiment, the cross-flow fan assembly 70 produces variable and reversible thrust by changing the pitch, or angles of blades 146 in response to an actuator assembly 71. Actuator assembly 71 may move parts of variable thrust cross-flow fan assembly 70 in a number of ways, including via mechanical actuation, hydraulic actuation or electronic actuation in a fly-by-wire environment. Actuator assembly 71 may receive input from a pilot via pedals or other source to operate cross-flow fan assembly 70 to control the rotational speed and direction the plurality of blades 146 such that the airflow and thrust is substantially perpendicular to axis 110 in vertical flight mode, and therefore in a substantially lateral direction relative to aircraft 10. In forward flight mode, the rotational speed and direction of the plurality of blades 146 produces sufficient airflow and thrust that is generally parallel to axis 110 and therefore in a substantially longitudinal direction relative to aircraft 10.

Referring to FIGS. 6, 7A-7C, 8A-8C and 8 in the drawings, a variable thrust cross-flow fan assembly 70, including various configurations thereof, is schematically illustrated. Cross-flow fan assembly 70 includes a forward driver plate 204 and an aft driver plate 206, which are coupled to, and rotatable by, drive shaft 208, which is operably coupled to drive shaft 50. Cross-flow fan assembly 70 also includes blades 210*a*-210*g*. Each blade 210*a*-210*g* has a respective forward end 212*a*-212*g* and a respective aft end 214*a*-214*g*. The forward ends 212*a*-212*g* of each of blades 210*a*-210*g* are rotatably coupled to an aft side of forward driver plate 204. The aft ends 214*a*-214*g* of blades 210*a*-210*g* are rotatably coupled to a forward side 216 of aft driver plate 206. Thus, when drive shaft 208 rotates forward and aft driver plates 204, 206, blades 210*a*-210*g* may rotate or pivot while rotating around drive shaft 208. In the illustrated embodiment, cross-flow fan assembly 70 including blades 210*a*-210*g*, rotate in a direction indicated by an arrow 217.

Figure 9:
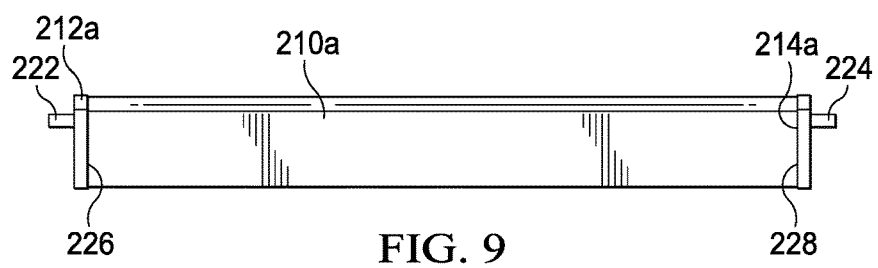
FIG. 9 is a top view of a blade of a variable thrust cross-flow fan assembly in accordance with an exemplary embodiment of the present disclosure.

Forward driver plate 204 forms linkage holes 218*a*-218*g*. Driver plate 206 also forms corresponding linkage holes that are not visible in the illustrated embodiments. As best seen in FIG. 9 forward end 212*a* of blade 210*a* includes a forward driver pin 222 and aft end 214*a* of blade 210*a* includes an aft driver pin 224. Blades 210*b*-210*g* include similar forward and aft driver pins. Each of the forward driver pins is insertable and rotatable within a respective linkage hole 218*a*-218*g* of forward drive plate 204. Likewise, each of the aft driver pins is insertable and rotatable within a respective linkage hole formed by aft driver plate 206. In the illustrated embodiment, driver pins 222, 224 are integral with or coupled to respective end caps 226, 228, as best seen in FIG. 9. In another embodiment, driver pins 222, 224 may be the opposite ends of a shaft (not shown) that extends longitudinally through the body of blade 210*a*.

Variable thrust cross-flow fan assembly 70 includes a control cam 230, which is movable relative to forward driver plate 204, along axis 232. In the illustrated embodiment, control cam 230 rotates at substantially the same speed and direction 217 as cross-flow fan assembly 70. Control cam 230 is coupled to blades 210*a*-210*g*. In particular, control cam 230 is coupled to blades 210*a*-210*g* by linkages 234*a*-234*g*. With particular reference to linkage 234*a* in FIG. 8A, linkage 234*a* has an inner end 236 and an outer end 238. Outer end 238 of linkage 234*a* is fixedly coupled to forward driver pin 222 of blade 210*a*, and therefore blade 210*a* does not rotate relative to linkage 234*a*. Similarly, each of linkages 234*b*-234*g* is fixedly coupled to a respective one of blades 210*b*-210*g*, as illustrated.

Figure 7A:
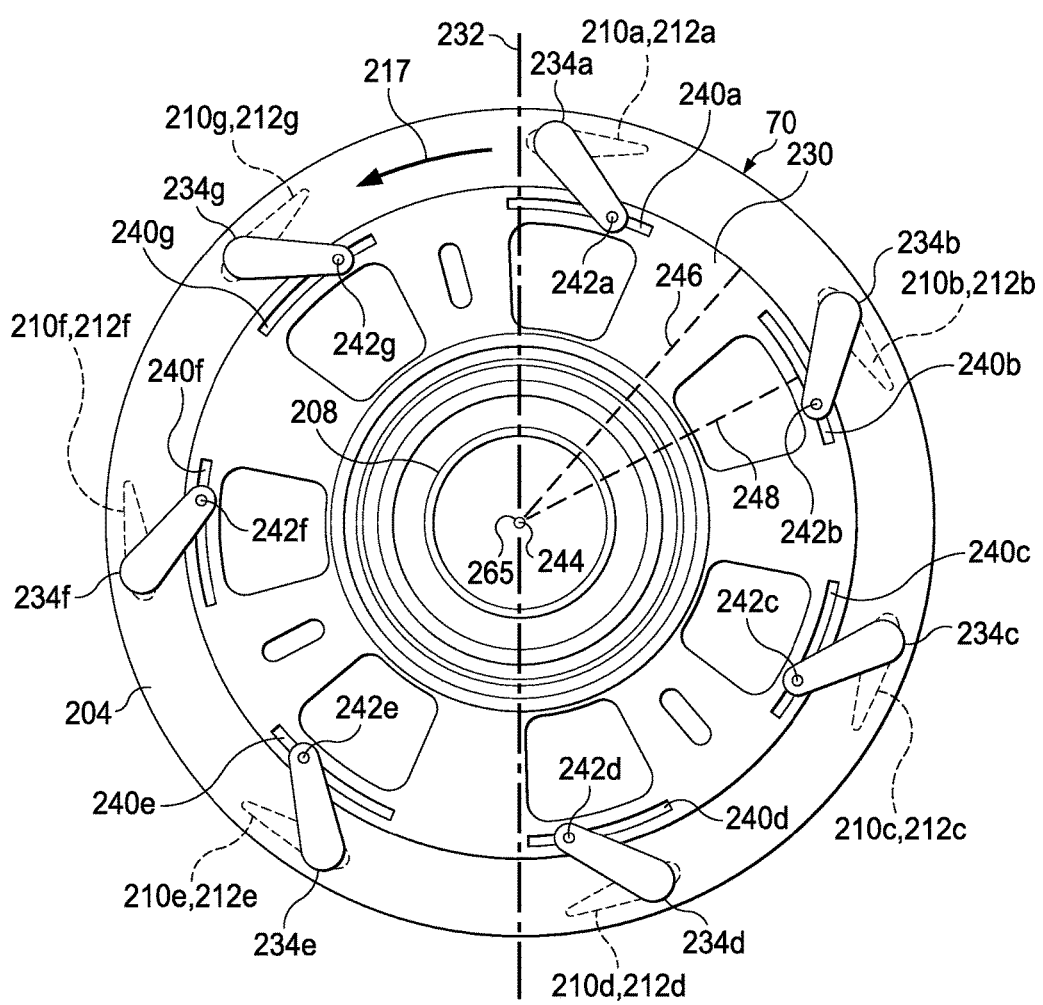
FIGS. 7A-7C are side views of a variable thrust cross-flow fan assembly in accordance with exemplary embodiments of the present disclosure.

Inner end 236 of linkage 234*a* is slidably coupled to control cam 230 at follower slot 240*a* of control cam 230. Similarly, inner ends of linkages 234*b*-234*g* are coupled to control cam 230 at follower slots 240*b*-240*g* of control cam 230. Follower slots 240*a*-240*g* allow the inner ends of linkages 234*a*-234*g* to move concentrically relative to control cam 230, while constraining the inner ends of linkages 234*a*-234*g* from moving in the radial direction. Referring again to linkage 234*a* as representative of all linkages 234*a*-234*g*, inner end 236 of linkage 234*a* includes a follower pin 242*a* that is at least partially inserted, and slidably engaged, with follower slot 240*a*. Indeed, follower pin 242*a* may slide along all or a portion of the length of follower slot 240*a*. In some embodiments, follower pin 242*a* may extend between two portions of linkage 234*a* that are on opposite sides of control cam 230. Similarly, follower pins 242*a*-242*g* on the inner end of each of linkages 234*a*-234*g* are slidably engaged with their respective follower slots 240*a*-240*g* in the same or similar manner as that described for linkage 234*a*. With particular reference to FIG. 7A, control cam 230 is generally circular having a center point 244 and radius 246. Each of follower slots 240*a*-240*g* form at least a portion of a circle, or circular arc, and has center point 244 and radius 248. In the illustrated embodiment, radius 246 of control cam 230 is larger than radius 248 of follower slots 240*a*-240*g*. Together, control cam 230, linkages 234*a*-234*g* and follower pins 242*a*-242*g* may be considered a control assembly coupled to blades 210*a*-210*g*. Cross-flow assembly 70 includes the control assembly.

Figure 8A:
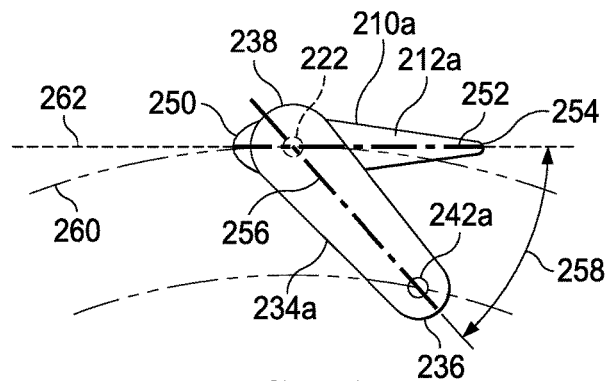
FIGS. 8A-8C are side views of a blade of a variable thrust cross-flow fan assembly having various pitch angles in accordance with exemplary embodiments of the present disclosure.

With particular reference to FIG. 8A, blade 210*a* has leading edge 250 and chord line 252. Chord line 252 extends from leading edge 250 to trailing edge 254 of blade 210*a*. Chord line 252 has a length defined as L. In some embodiments, forward driver pin 222 may be located a distance of approximately L/4, or quarter chord, from leading edge 250. In other embodiments, blade 210*a* may be rotatable around a point that is L/4 from leading edge 250, whether or not forward driver pin 222 is utilized. In yet other embodiments, forward driver pin 222, or a point of rotation for blade 210*a*, may be located anywhere along chord line 252. Each of blades 210*a*-210*g* may have the same or similar placement of a point of rotation or a forward driver pin as that described with respect to blade 210*a* in FIG. 8A.

In the illustrated embodiment, blades 210*a*-210*g* form an acute angle with the respective linkages 234*a*-234*g* to which they are coupled. With particular reference to FIG. 8A, linkage 234*a* has a centerline 256. Angle 258 formed between chord line 252 of blade 210*a* and centerline 256 of linkage 234*a* is an acute angle. In other embodiments, angle 258 may be another type of angle, such as an obtuse angle. Control cam 230 is shown in the illustrated embodiments to be circular, however, a control cam of the present disclosure may be any shape that enables some or all of the control cam functionality described in the illustrative embodiments. For example, control cam 230 may have an irregular shape, while still forming follower slots 240a-240g.

Cross-flow fan assembly 70, and therefore blades 210a-210g, may have any length depending on the application. Varying the length of blades 210a-210g may help to accommodate the centrifugal load on each of blades 210a-210g. By way of non-limiting example, blades 210a-210g may be on the order of one or more inches or one or more feet. In addition, while the illustrated embodiments show cross-flow fan assembly 70 to have seven blades 210a-210g, cross-flow fan assembly 70 may have any number of blades depending on the particular application both less than or greater than seven. The number of linkages, follower slots, follower pins and other parts accompanying each blade may also vary as the number of blades changes. Blades 210a-210g preferably have a shape suitable for providing thrust in accordance with the illustrative embodiments. By way of non-limiting example, blades 210a-210g may have an airfoil shape, arc shape or teardrop shape. Blades 210a-210g may also be either symmetric or non-symmetric along each blade's chord line. Blades 210a-210g may have any thickness or stiffness suitable to withstand the centrifugal load of the particular application and may be formed from any suitable material, including metals such as aluminum and composites such as carbon epoxy. Blades 210a-210g may be hollow or solid and may be formed using any suitable method of manufacture.

To produce thrust, blades 210a-210g may move into one of an infinite number of pitch angle configurations in response to movement of control cam 230 along axis 232. Control cam 230 is movable relative to forward driver plate 204, and in particular, control cam 230 is movable, or translatable, into an infinite number of positions along a plane substantially parallel to forward driver plate 204. By traveling along axis 232, control cam 230 rotates blades 210a-210g via linkages 234a-234g. While each of blades 210a-210g may have a different pitch angle, the positions of all of blades 210a-210g are referred to, in the collective sense, as pitch angle configurations. In some embodiments, the control assembly is operable to change the pitch angle configuration of blades 210a-210g to selectively generate thrust in a plurality of directions including a first direction and a second, opposite direction.

In the illustrated embodiment, blades 210a-210g rotate in a counterclockwise manner, indicated by arrow 217, along a circular path of travel 260. Depending on the pitch angle configuration, each blade 210a-210g may have a positive, negative or zero pitch angle at any particular point around circular path of travel 260 during each revolution. Blade 210a is shown to have substantially zero pitch in FIG. 8A, a positive pitch angle in FIG. 8B and a negative pitch angle in FIG. 8C. Referring particularly to FIG. 8A, circular path of travel 260 is the path along which forward driver pin 222 travels. A tangential projection 262 is also shown for blade 210a. For purposes of reference, tangential projection 262 is tangential to the circular path of travel 260 at a point at which circular path of travel 260 and forward driver pin 222 intersect. Tangential projection 262 may also be a line tangential to the circular path of travel of a point of rotation for blade 210a. In FIG. 8A, blade 210a may be considered to have substantially zero, or extremely low, pitch because the angle between tangential projection 262 and chord line 252 of blade 210a is substantially, or very close to, zero.

Figure 7B:
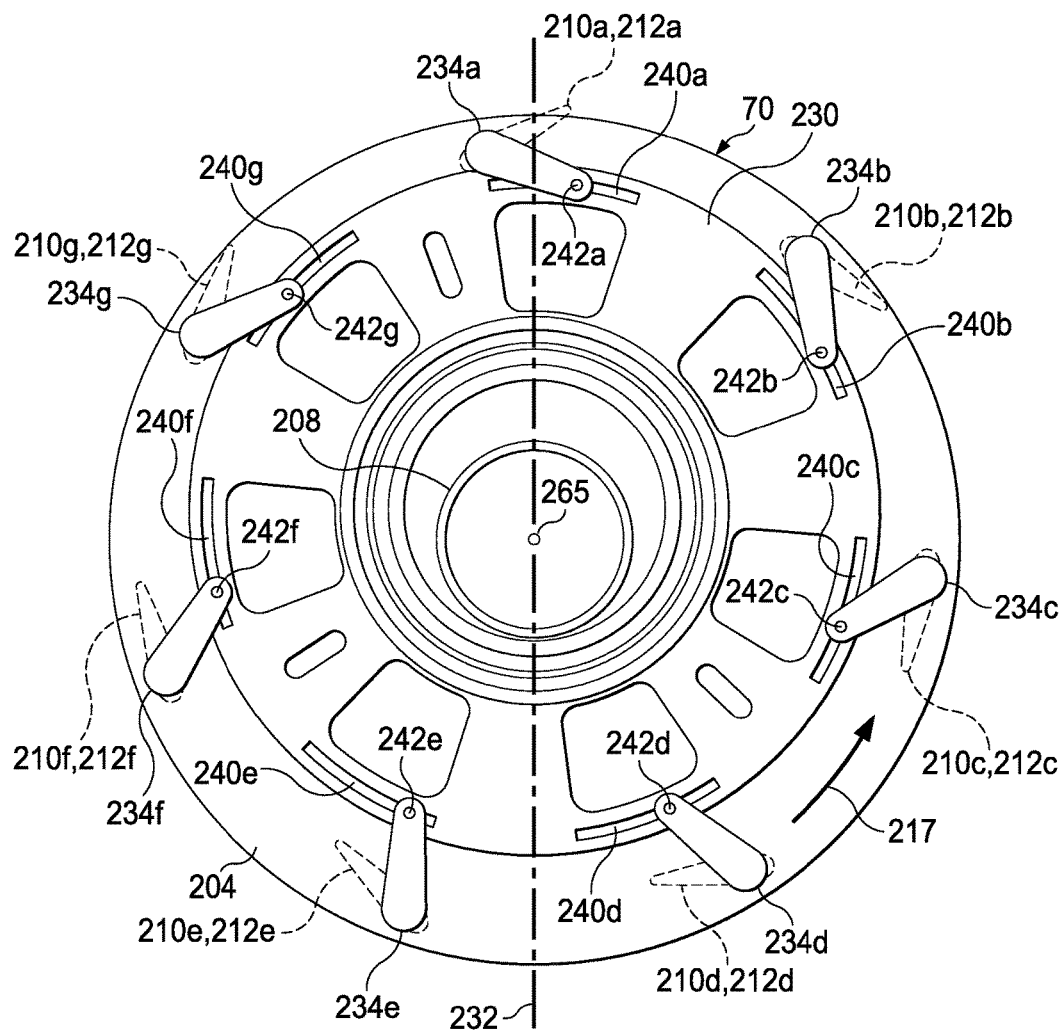
Figure 7C:
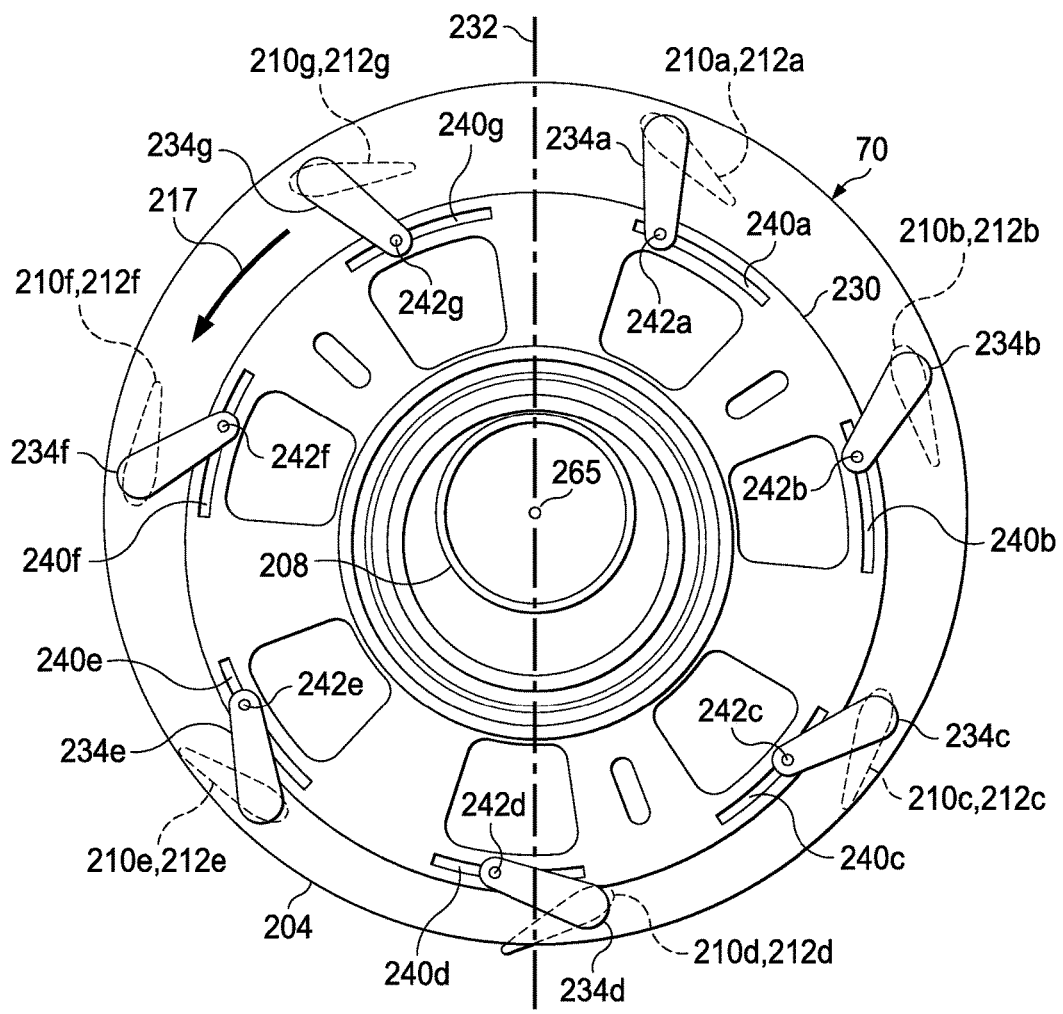
Figure 8B:
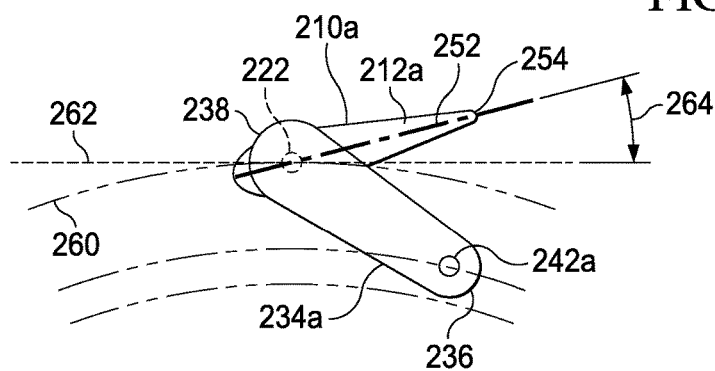
Figure 8C:
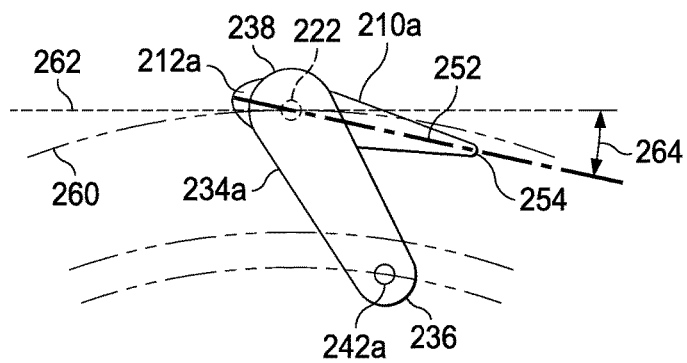

Referring to FIGS. 7B and 8B, blade 210a is shown to have a positive pitch angle. Blade 210a has a positive pitch angle because trailing edge 254 is biased away from center point 265 of circular path of travel 260 and angle 264 formed between chord line 252 and tangential projection 262 is non-zero. Referring to FIGS. 7C and 8C, blade 210a has a negative pitch angle because trailing edge 254 of blade 210a is biased towards center point 265 of circular path of travel 260 and angle 264 formed between chord line 252 and tangential projection 262 is non-zero.

Referring to FIGS. 7A-7C, three positions of control cam 230 are shown. In FIG. 7A, control cam 230 is substantially concentric with drive shaft 208, forward driver plate 204 and circular path of travel 260. In this state, blades 210a-210g are in a neutral configuration and each of blades 210a-210g have a substantially zero pitch during each rotation around circular path of travel 260, as illustrated in FIG. 8A. When blades 210a-210g are in the neutral configuration, all of blades 210a-210g have a zero angle of attack, and therefore produce no thrust in either direction.

Referring to FIG. 7B, blades 210a-210g are in a downward thrust configuration as a result of control cam 230 moving to an upward position relative to the aircraft. In the downward thrust configuration, the pitch angles of each of blades 210a-210g fluctuate between positive and negative pitch angles during each revolution around circular path of travel 260 such that a downward thrust is produced thereby. When control cam 230 is in a position that causes blades 210a-210g to be in the downward thrust position, blades 210a-210g rotate eccentrically in relation to control cam 230. Control cam 230 is also eccentric to the axis of rotation of both drive shaft 208 and cross-flow fan assembly 70 while in the downward thrust position. Also, while in the downward thrust position of the illustrated embodiment, the topmost edges of control cam 230 and forward driver plate 204 are closer together than the bottommost edges of control cam 230 and forward driver plate 204. Control cam 230 moves in the opposite direction as the thrust produced when blades 210a-210g rotate along circular path of travel 260.

Blades 210a, 210b, 210g are located on a top portion of circular path of travel 260 and each have varying positive pitch angles depending on their respective locations in the rotation cycle. Blade 210a, which is substantially topmost in circular path of travel 260, has the largest positive pitch angle of all blades 210a-210g. Each blade 210a-210g progressively moves into or out of this most positive pitch angle of blade 210a as each blade 210a-210g moves into or out of the substantially topmost position at which blade 210a is shown.

Blades 210c, 210d, 210e, 210f are each on a bottom portion of circular path of travel 260 for blades 210a-210g. Blades 210c, 210d, 210e, 210f that are on the bottom portion of the circular path of travel 260 each have varying negative pitch angles. Each blade 210a-210g has its largest negative pitch angle when it reaches the bottommost point of circular path of travel 260. The pitch angles of blades 210a-210g are substantially zero at the leftmost and rightmost points of circular path of travel 260, thereby causing substantially zero thrust in the horizontal directions. Each of blades 210a-210g have substantially zero pitch angles twice during each revolution along circular path of travel 260, namely, at the leftmost and rightmost points of circular path of travel 260. Taken together, the downward thrust configuration of blades 210a-210g shown in FIG. 7B produces a downward thrust in a vertical flight mode for the aircraft as blades 210a-210g rotate in the direction indicated by arrow 217.

Referring to FIG. 7C, control cam 230 has moved downward, relative to the aircraft, from the neutral position of FIG. 7A to cause blades 210a-210g to move into an upward thrust configuration. In the upward thrust configuration, blades 210a-210g rotate, along arrow 217, to produce an upward thrust for the aircraft. Similar to the downward thrust configuration shown in FIG. 7B, in the upward thrust configuration blades 210a-210g change pitch angle during each revolution around circular path of travel 260. In particular, in the upward thrust configuration each of blades 210a-210g fluctuates between a positive and negative pitch angle during each revolution around circular path of travel 260.

Control cam 230 has moved in an opposite direction from the upward thrust produced by blades 210a-210g in the upward thrust configuration. Also, the distance between the topmost point of control cam 230 and the topmost point of forward driver plate 204 is greater than the distance between the bottommost point of control cam 230 and the bottommost point of forward driver plate 204. The circular path of travel 260 in the upward thrust configuration is eccentric to control cam 230. In the upward thrust configuration, control cam 230 is also eccentric to the axis of rotation of drive shaft 208 and cross-flow fan assembly 70. In the upward thrust configuration, blades 210c, 210d, 210e, located on the bottom portion of circular path of travel 260, each have positive pitch angles that are different from one another. Blades 210a, 210b, 210f, 210g, located on the top portion of circular path of travel 260, each have varying negative pitch angles. Blades 210a-210g, when at the leftmost or rightmost point of each revolution, have a substantially zero pitch angle, thereby producing substantially zero horizontal thrust in the illustrated embodiment. Each of blades 210a-210g have substantially zero pitch angles twice during each revolution along circular path of travel 260, namely, at the leftmost and rightmost points of circular path of travel 260.

In the downward and upward thrust configurations shown in FIGS. 7B and 7C, each blade 210a-210g may produce a lift, or thrust, force approximately along a radial line between each blade's quarter chord point and center point 265 of circular path of travel 260. The thrust force generated by each blade 210a-210g may be proportional to the angle of attack, or pitch, of the individual blade. In the manner described, a pilot of the aircraft may vary the thrust of cross-flow fan system 200 by changing the lateral position of control cam 230. The downward and upward thrusts described herein, opposite in direction, are produced by a single cross-flow fan assembly 70 that rotates at a substantially constant speed that is substantially equal to the rotational speed of drive shaft 208. Indeed, control cam 230 may be in an infinite number of positions along the axis 232 to produce an infinite number of potential thrust intensities in either the downward or upward direction.

Referring next to FIGS. 10A-10E and 11 in the drawings, a variable thrust cross-flow fan assembly is schematically illustrated and generally designated 300. Variable thrust cross-flow fan assembly 300 includes a plurality of blades 302a-302h that are shown in a variety of pitch angle configurations, which change in response to an input received from a pilot of the aircraft or from elsewhere. FIGS. 10A-10E show cross sectional views of an interior housing 304 having a left portion 304a and a right portion 304b. In illustrated embodiment, it is noted that blades 302a-302h form obtuse angles with the respective linkages to which they are attached. As discussed above, blades 302a-302h may form either obtuse or acute angles with their respective linkages. Also, in the illustrated embodiment, blades 302a-302h rotate in a counterclockwise direction at a substantially constant speed during aircraft flight.

Figure 10C:
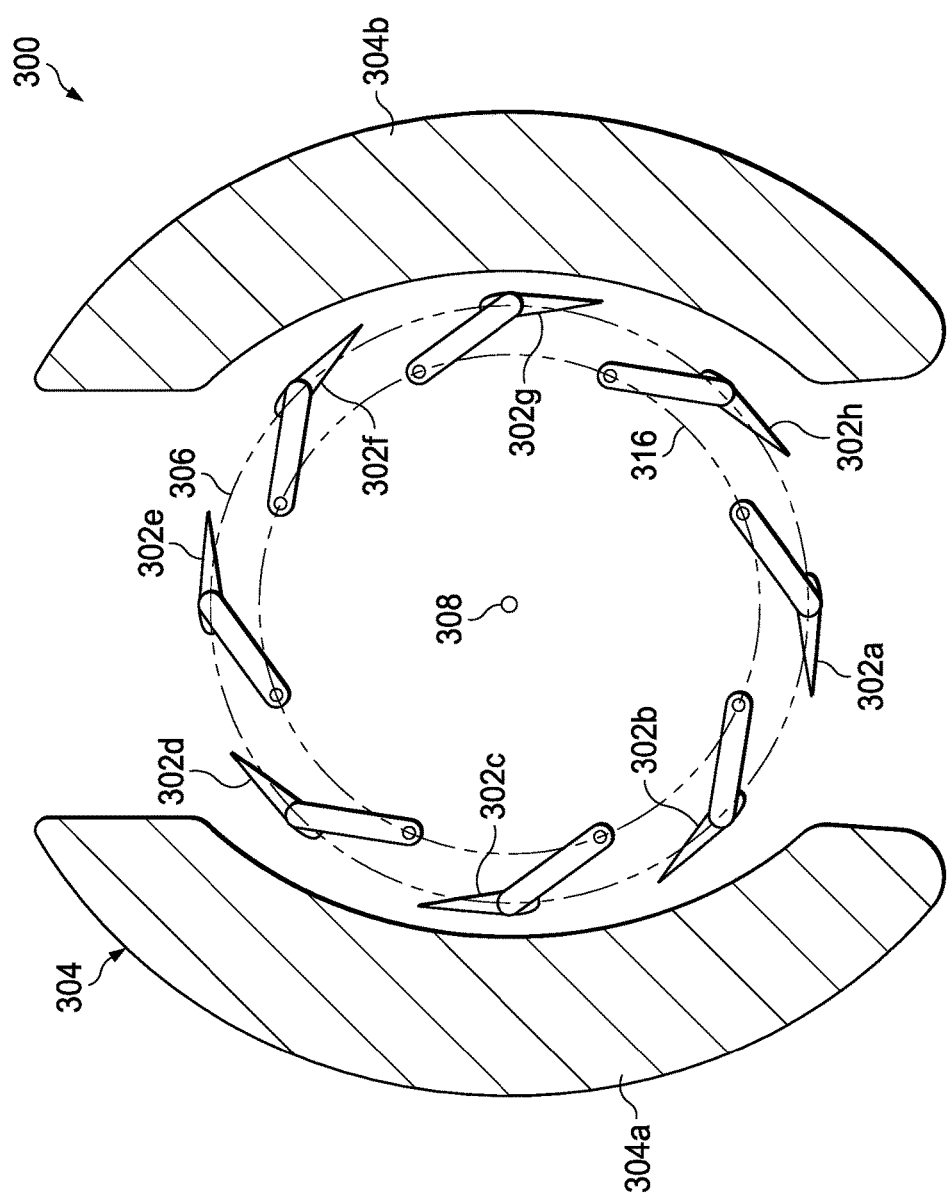

Referring specifically to FIG. 10C, blades 302a-302h are in a neutral pitch angle configuration as the control cam (not shown) is substantially concentric with circular path of travel 306 of blades 302a-302h. Input may be received from a pilot of the aircraft that causes the control cam to be shifted from the neutral position. For example, the input may be one or more switches, buttons or other controls in the cockpit of the aircraft. The switches, buttons or other controls may allow for varying degrees of input intensity, expressed as a continuum on the x-axis of FIG. 11. In particular, the switches, buttons or other controls may allow for input ranging from −100% to 100%, and points therebetween. Other examples of input controls by which the control cam may be moved to produce a reversible thrust include a control stick, knobs, sliders, voice controls, touchscreen controls or electronic input, to name a few. Each of these input controls may allow for the continuum of input positions expressed on the x-axis of FIG. 11. In this manner, the reversible thrust produced by variable thrust cross-flow fan system 300 may have a direction and intensity that is determined by the input position originating from the cockpit of the aircraft or from elsewhere.

In the present example, in which blades 302a-302h have a neutral pitch angle configuration, substantially zero thrust is produced. A neutral position center point 308, which is the center point of the control cam when the control cam is in the neutral configuration, is shown. Further, the input position originating from an input control of the aircraft may be at 0%, as indicated by point 310 in FIG. 11. Moving to FIG. 10A, a maximum downward thrust 312 is produced by blades 302a-302h in the depicted pitch angle configuration. In this downward thrust configuration, maximum downward thrust 312 is at −100% of variable thrust cross-flow fan system's thrust range (−100% to 100%), as indicated by point 314 in FIG. 11. Maximum downward thrust 312 corresponds with an input position of −100% from one of the exemplary input controls described above.

In the maximum downward thrust configuration of FIG. 10A, the control cam has moved downward of neutral position 316 of the control cam to a maximum allowable extent. The distance that the control cam has moved is schematically illustrated by showing neutral position center point 308 relative to center point 318 of the control cam. It is also noted that the control cam has moved in the same direction as the thrust produced by blades 302a-302h. This is in contrast to the illustrative embodiments shown in FIGS. 6, 7A-7C, 8A-8C and 9, in which the control cam moved in an opposite direction as the thrust produced by the blades of the variable thrust cross-flow fan system. Among other factors, the direction that the control cam moves relative to the thrust direction may be caused by whether the angle between each blade and its respective linkage is acute or obtuse. Airflows through blades 302a-302h as indicated by high-density airflow arrows 320. It is noted that airflows through blades 302a-302h in an opposite direction as the thrust produced by blades 302a-302h.

Figure 11:
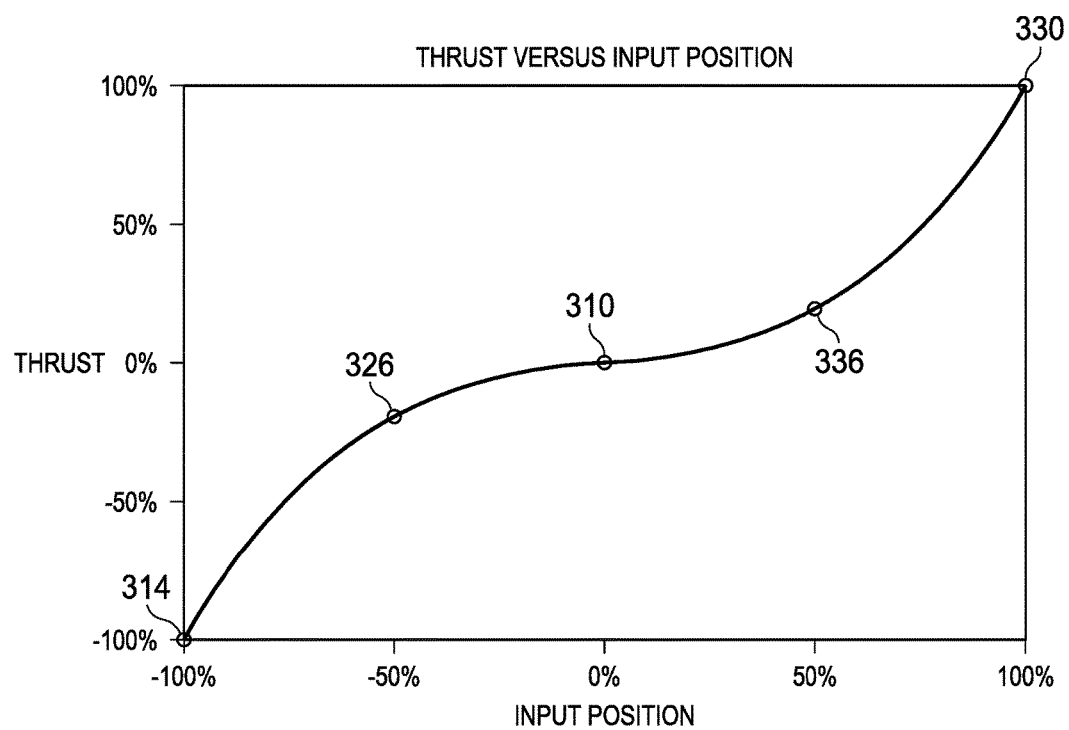
FIG. 11 is a chart illustrating input position versus thrust for a variable thrust cross-flow fan assembly in accordance with exemplary embodiments of the present disclosure.

Moving to FIG. 10B, blades 302a-302h remain in a downward thrust pitch angle configuration. However, the control cam is closer to neutral position 316 than it was in FIG. 10A, thereby causing an intermediate downward thrust 322, which is less than maximum downward thrust 312 in FIG. 10A. The reduced thrust is generated as the maximum pitch angles of blades 302a-302h are reduced and the airflow through variable thrust cross-flow fan system 300 is reduced as indicated by the reduced density airflow arrows 324. The distance that the control cam has moved is schematically illustrated by showing neutral position center point 308 relative to center point 318 of the control cam. With reference to FIG. 11, intermediate downward thrust 322 is approximately 20% of maximum downward thrust 312, as indicated by point 326. In the illustrated embodiment, an input position of −50% produces the intermediate downward thrust 322 of approximately 20% of maximum downward thrust 312.

In the downward thrust configurations shown in FIGS. 10A and 10B, as each blade 302a-302h follows circular path of travel 306, blades 302a-302h transition between positive pitch, zero pitch, negative pitch, zero pitch and back to positive pitch during each revolution of the cross-flow fan assembly. As blades 302a-302h approach the topmost point of circular path of travel 306, the blades have progressively greater positive pitch reaching a maximum positive pitch at the topmost point of circular path of travel 306. Thereafter, as blades 302a-302h retreat from the topmost point of circular path of travel 306, the blades have progressively lesser positive pitch reaching zero pitch proximate leftmost point of circular path of travel 306. As blades 302a-302h approach the bottommost point of circular path of travel 306, the blades have progressively greater negative pitch reaching a maximum negative pitch at the bottommost point of circular path of travel 306. Thereafter, as blades 302a-302h retreat from the bottommost point of circular path of travel 306, the blades have progressively lesser negative pitch, reaching zero pitch proximate rightmost point of circular path of travel 306. Each blade 302a-302h repeats this cycle on each revolution of the cross-flow fan assembly.

With reference to FIG. 10E, a maximum upward thrust 328 is produced by blades 302a-302h in the depicted pitch angle configuration which corresponds to point 330 in FIG. 11 and the 100% location on the continuum of −100% to 100%. When blades 302a-302h produce maximum upward thrust 328, the control cam has been moved a maximum allowable distance upward of neutral position 316. The distance that the control cam has moved is schematically illustrated by showing neutral position center point 308 relative to center point 318 of the control cam. In the illustrated embodiment, an upward move of the control cam corresponds to an upward thrust. The upward thrust that is produced by blades 302a-302h is the opposite of the airflow direction through blades 302a-302h, as indicated by high-density airflow arrows 332. As shown in FIG. 10E, maximum upward thrust 328 corresponds with an input position of 100% from one of the exemplary input controls described above.

With reference to FIG. 10D, blades 302a-302h produce an intermediate upward thrust 334 in the depicted pitch angle configuration. Intermediate upward thrust 334 is less than maximum upward thrust 328. In particular, intermediate upward thrust 334 is approximately 20% of maximum upward thrust 328, as indicated by point 336 in FIG. 10. The control cam is closer to neutral position 316 than in the maximum upward thrust configuration of FIG. 9E. The distance that the control cam has moved is schematically illustrated by showing neutral position center point 308 relative to center point 318 of the control cam. To achieve intermediate upward thrust 334, the input position has been set at 50% from one of the exemplary input controls described above, as shown in FIG. 10. The reduced thrust is generated as the maximum pitch angles of blades 302a-302h are reduced and the airflow through variable thrust cross-flow fan system 300 is reduced as indicated by the reduced density airflow arrows 338.

In the upward thrust configurations shown in FIGS. 10D and 10E, as each blade 302a-302h follows circular path of travel 306, blades 302a-302h transition between positive pitch, zero pitch, negative pitch, zero pitch and back to positive pitch during each revolution of the cross-flow fan assembly. As blades 302a-302h approach the bottommost point of circular path of travel 306, the blades have progressively greater positive pitch reaching a maximum positive pitch at the bottommost point of circular path of travel 306. Thereafter, as blades 302a-302h retreat from the bottommost point of circular path of travel 306, the blades have progressively lesser positive pitch reaching zero pitch proximate rightmost point of circular path of travel 306. As blades 302a-302h approach the topmost point of circular path of travel 306, the blades have progressively greater negative pitch reaching a maximum negative pitch at the topmost point of circular path of travel 306. Thereafter, as blades 302a-302h retreat from the topmost point of circular path of travel 306, the blades have progressively lesser negative pitch, reaching zero pitch proximate leftmost point of circular path of travel 306. Each blade 302a-302h repeats this cycle on each revolution of the cross-flow fan assembly.

Figure 12A:
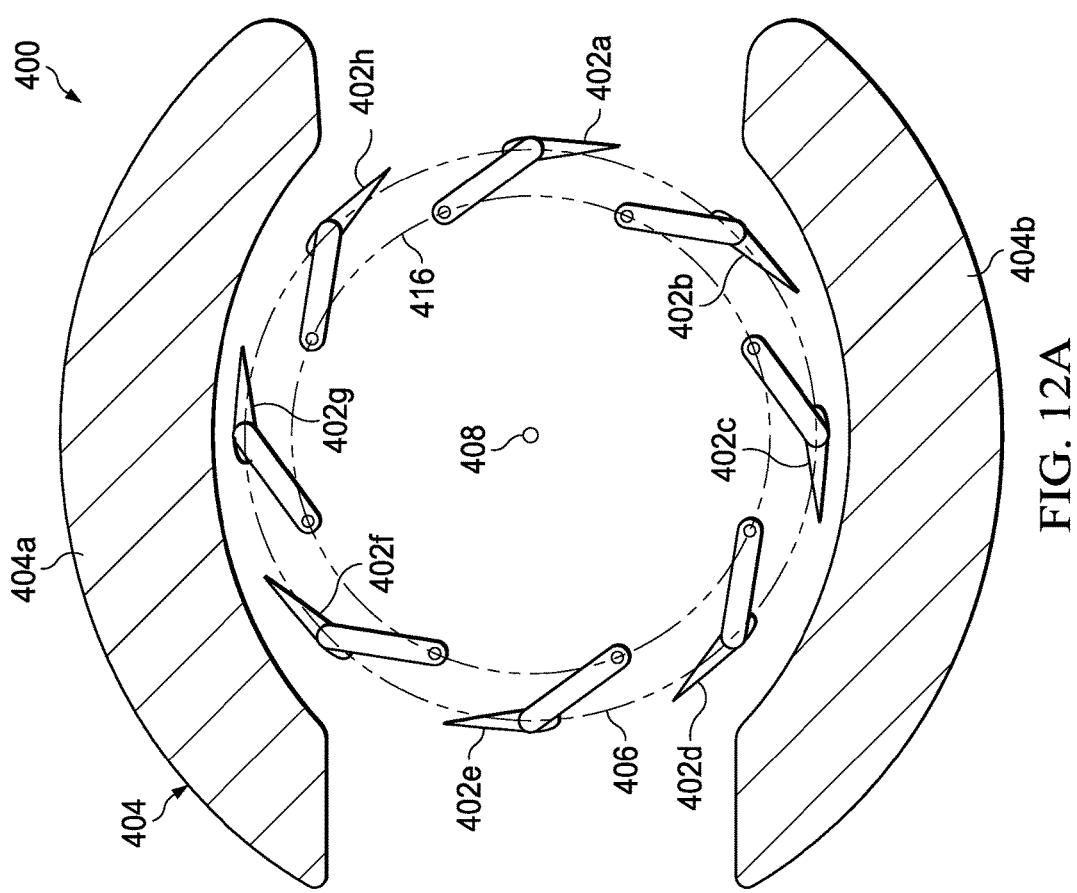
FIGS. 12A-12C are schematic illustrations of the blades of a variable thrust cross-flow fan assembly producing variable thrust in forward flight mode in accordance with exemplary embodiments of the present disclosure.
Figure 12B:
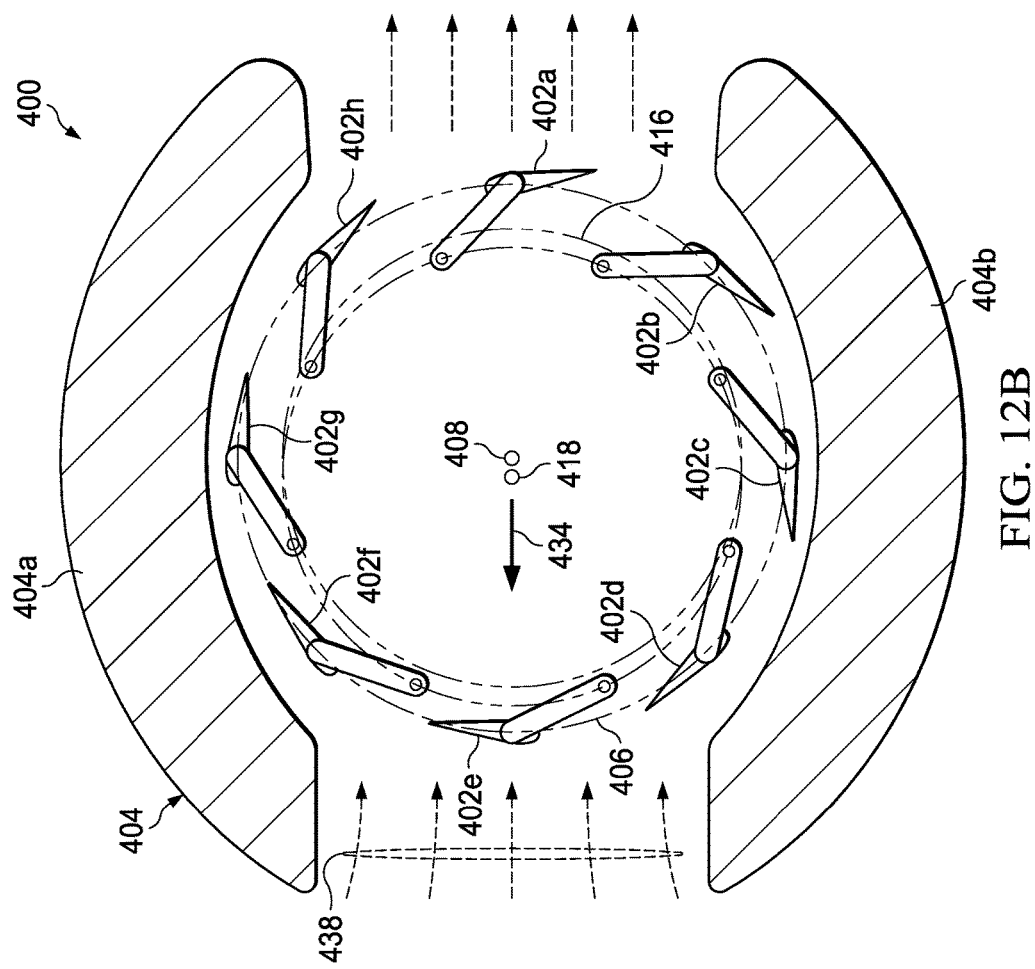
Figure 12C:
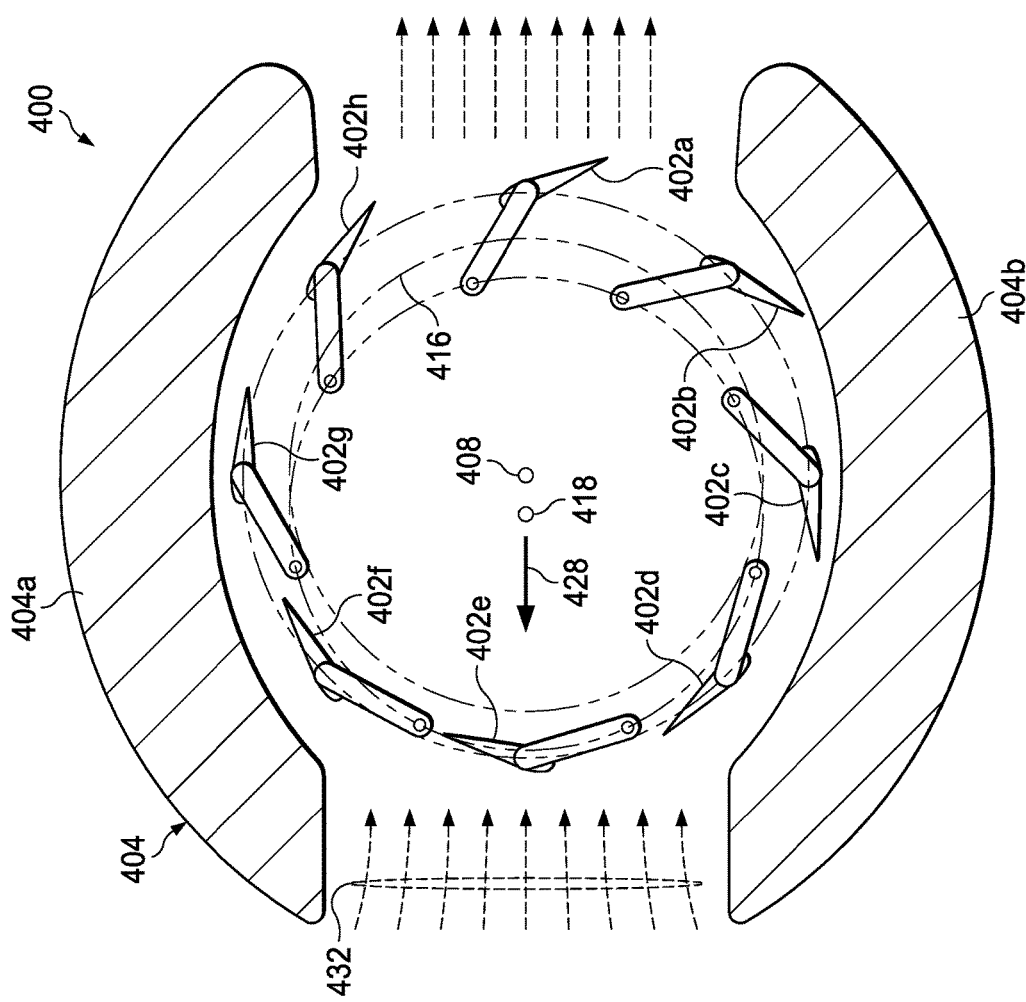

Referring next to FIGS. 12A-C, a variable thrust cross-flow fan assembly in forward flight mode is schematically illustrated and generally designated 400. Certain features of the variable thrust cross-flow fan assembly 400 are as described above and bear similar reference characters to the variable thrust cross-flow fan assembly 300, but with a leading '4' rather than a leading '3'. The illustrated schematic cross sections are viewed from a distal end of the cross-flow fan system 30 and include an interior housing 404 having an upper portion 404a and a lower portion 404b.

Referring specifically to FIG. 12A, blades 402a-402h are in a neutral pitch angle configuration as the control cam (not shown) is substantially concentric with circular path of travel 406 of blades 402a-402h. Input may be received from a pilot of the aircraft 10 that causes the control cam to be shifted from the neutral position as discussed above with reference to FIGS. 10A-10E. In the present example, in which blades 402a-402h have a neutral pitch angle configuration, substantially zero thrust is produced in forward flight mode. A neutral position center point 408, which is the center point of the control cam when the control cam is in the neutral configuration, is shown.

With reference to FIG. 12C, a maximum forward thrust is generated by maximum left thrust 428 is produced by blades 402a-402h in the depicted pitch angle configuration which corresponds to point 314 in FIG. 11 and the −100% location on the continuum of −100% to 100%. When blades 402a-402h produce maximum left thrust 428, the control cam has been moved a maximum allowable distance to the left of neutral position 416. The distance that the control cam has moved is schematically illustrated by showing neutral position center point 408 relative to center point 418 of the control cam. In the illustrated embodiment, a leftward move of the control cam corresponds to a leftward thrust. The left thrust that is produced by blades 402a-402h is the opposite of the airflow direction through blades 402a-402h, as indicated by high-density airflow arrows 432. As shown in FIG. 11, maximum left thrust 428 corresponds with an input position of −100% from one of the exemplary input controls described above.

Finally, with reference to FIG. 12B, blades 402a-402h produce an intermediate left thrust 434 in the depicted pitch angle configuration. Intermediate left thrust 434 is less than maximum left thrust 428. In particular, intermediate left thrust 434 is approximately 20% of maximum left thrust 428, as indicated by point 326 in FIG. 11. The control cam is closer to neutral position 416 than in the maximum left thrust configuration of FIG. 12C. The distance that the control cam has moved is schematically illustrated by showing neutral position center point 408 relative to center point 418 of the control cam. To achieve intermediate left thrust 434, the input position has been set at −50% from one of the exemplary input controls described above, as shown in FIG. 11. The reduced thrust is generated as the maximum pitch angles of blades 402a-402h is reduced and the airflow through variable thrust cross-flow fan system 400 is reduced as indicated by the reduced density airflow arrows 438.

In the left thrust configurations shown in FIGS. 12B and 12C, as each blade 402a-402h follows circular path of travel 406, blades 402a-402h transition between positive pitch, zero pitch, negative pitch, zero pitch and back to positive pitch during each revolution of the cross-flow fan assembly. As blades 402a-402h approach the rightmost point of circular path of travel 406, the blades have progressively greater positive pitch reaching a maximum positive pitch at the rightmost point of circular path of travel 406. Thereafter, as blades 402a-402h retreat from the rightmost point of circular path of travel 406, the blades have progressively lesser positive pitch reaching zero pitch proximate topmost point of circular path of travel 406. As blades 402a-402h approach the leftmost point of circular path of travel 406 the blades have progressively greater negative pitch reaching a maximum negative pitch at the leftmost point of circular path of travel 406. Thereafter, as blades 402a-402h retreat from the leftmost point of circular path of travel 406, the blades have progressively lesser negative pitch, reaching zero pitch proximate bottommost point of circular path of travel 406. Each blade 402a-402h repeats this cycle on each revolution of the cross-flow fan assembly. The embodiments of the left thrust configurations shown in FIGS. 12B and 12C can be reversed to provide right thrust configurations.

FIGS. 10A-10E and 12A-12C illustrate the variability of the thrust based upon the pitch angle configuration of blades 302a-302h, 402a-402h which varies responsive to control cam movement. As illustrated and described, the thrust generated by variable thrust cross-flow fan assembly 300, 400 is variable in both intensity and direction, either an upward or downward direction, and is therefore reversible. Even though pitch angle configurations of blades 302a-302h and 402a-h have been shown in FIGS. 10A-10E and 12A-12C, it should be understood by those skilled in the art that blades 302a-302h, 402a-402h may have an infinite number of pitch angle configurations producing an infinite number of thrust intensities, by moving the control cam along an infinite number of possible points along an axis lateral to the direction of travel of the aircraft. Indeed, with reference to FIG. 11, the thrust intensity and direction may vary according to the illustrated curve, including any point thereon. In this manner, a pilot may vary the input position of an input control to vary the thrust intensity and direction produced by variable thrust cross-flow fan system 300, 400 to manage the direction, speed, pitch, roll, and yaw of the aircraft. Even though a particular input versus moment curve has been depicted and described, it should be understood by those skilled in the art that the input versus moment curve for a particular implementation will vary based upon factors including the size, shape and materials used to form the blades, the number of blades, the rotational speed of the cross-flow fan system and other parameters.

Referring now to FIG. 13 in the drawings, a variable thrust cross-flow fan system is schematically illustrated and generally designated 500. In the illustrative embodiment, variable thrust cross-flow fan assembly 500 includes a plurality of blades, only blades 502a-502d being visible, wherein each of the blades is divided into seven blade segments. The blade segments of each blade 502a-502d are separated by divider plates 504a-504f, which are disposed at regular intervals between forward driver plate 506 and aft driver plate 508. Each of divider plates 504a-504f is substantially parallel to both forward driver plate 506 and aft driver plate 508. In addition, divider plates 504a-504f may be substantially the same shape as forward driver plate 506 and aft driver plate 508. Each divider plate 504a-504f divides adjacent segments of each blade 502a-502d. For example, divider plate 504a divides blade segments 510, 512 of blade 502c. By dividing blades 502a-502d into smaller blade segments, divider plates 504a-504f may increase the tolerance of blades 502a-502d to centrifugal forces resulting from the rotation of the cross-flow fan assembly. An actuator assembly (not shown), such as actuator assembly 71 in FIG. 5A, may move control cam 514 in a number of ways, including via mechanical actuation, hydraulic actuation or electronic actuation in a fly-by-wire environment, so as to change the pitch angle configuration of blades 502a-502d using input controls as described above.

Figure 14:
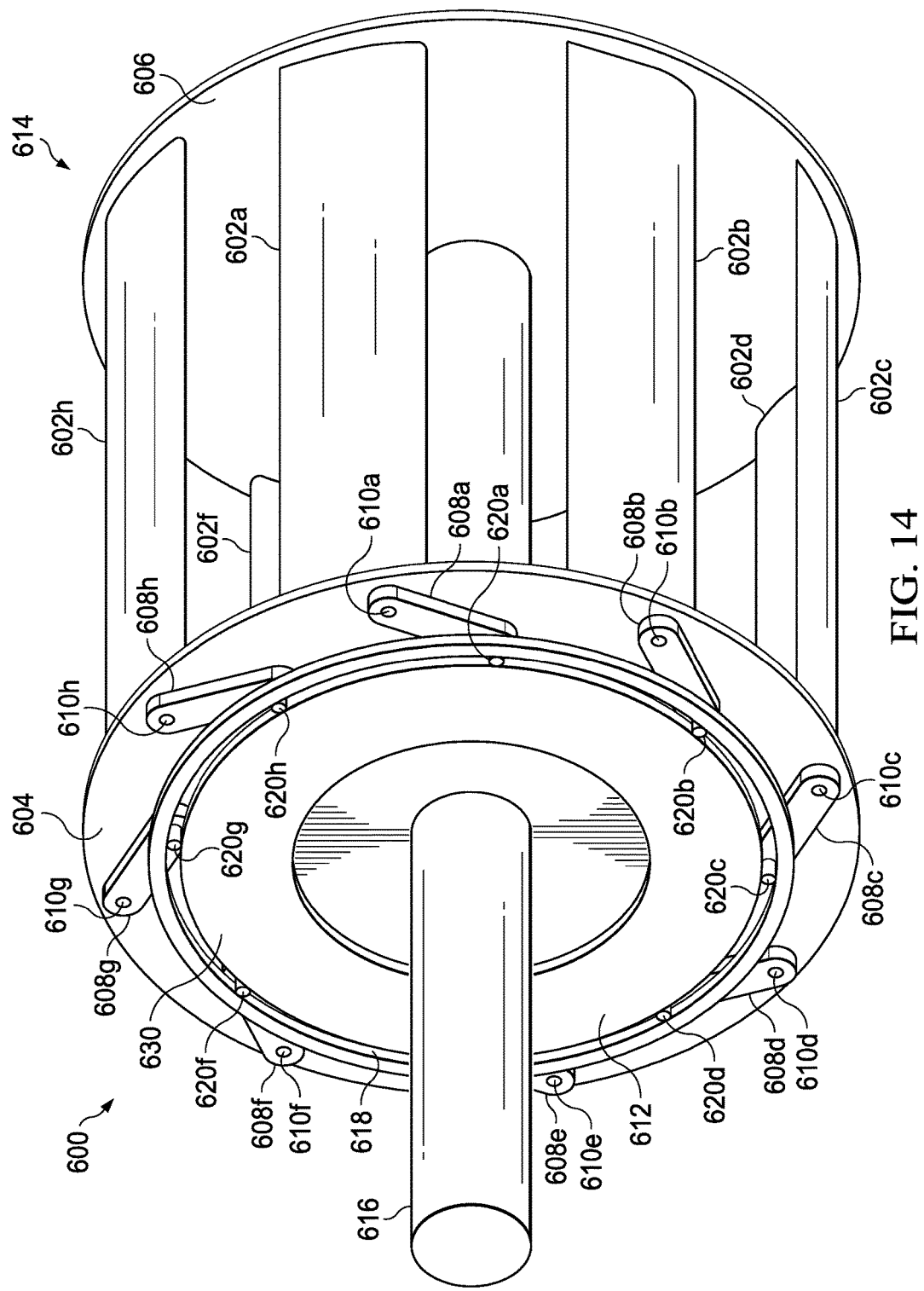
FIG. 14 is an isometric view of a variable thrust cross-flow fan assembly in accordance with exemplary embodiments of the present disclosure.
Figure 15:
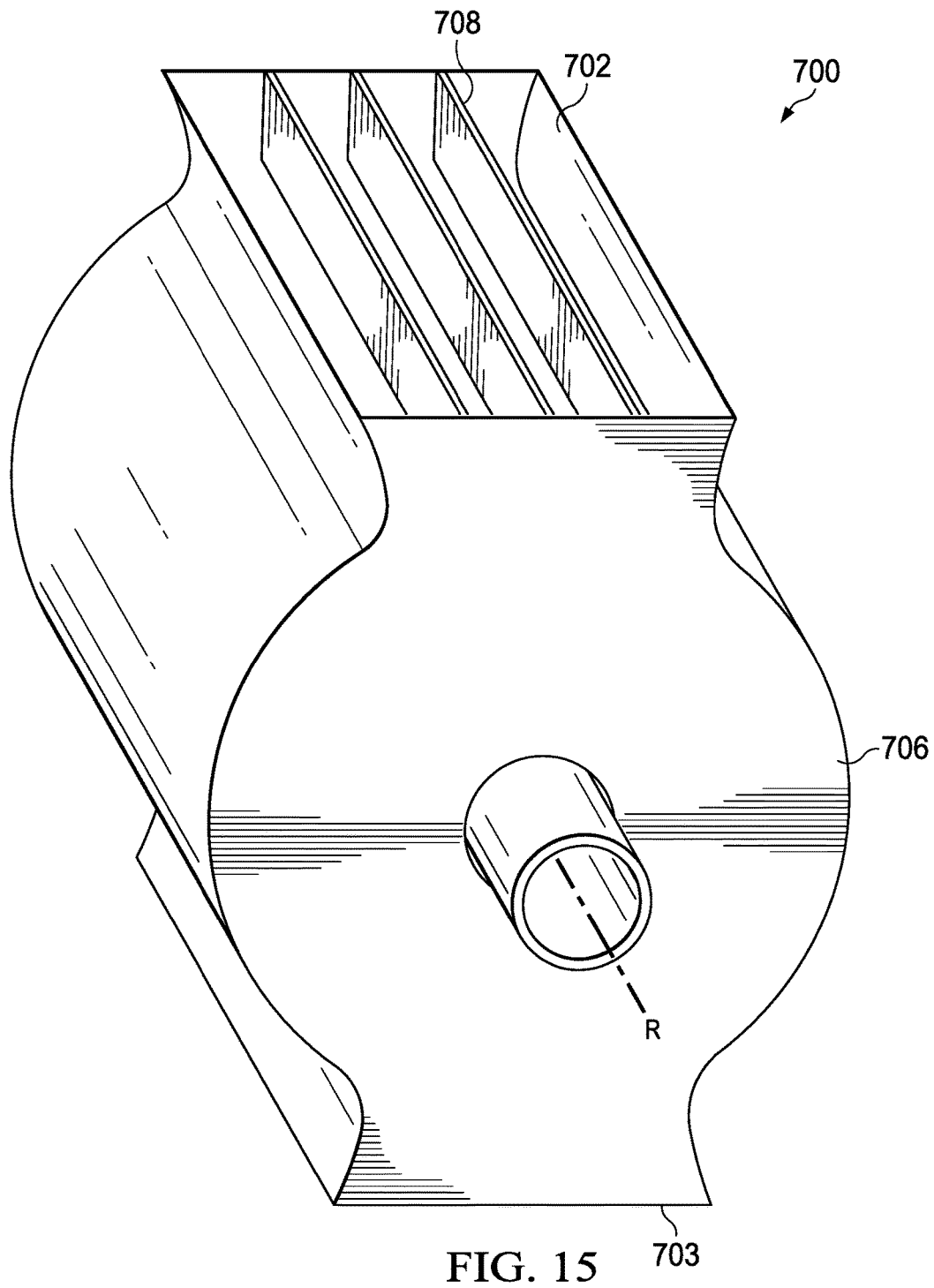
FIG. 15 is an isometric view of an interior duct in vertical flight mode for a variable thrust cross-flow fan assembly in accordance with exemplary embodiments of the present disclosure.
Figure 16:
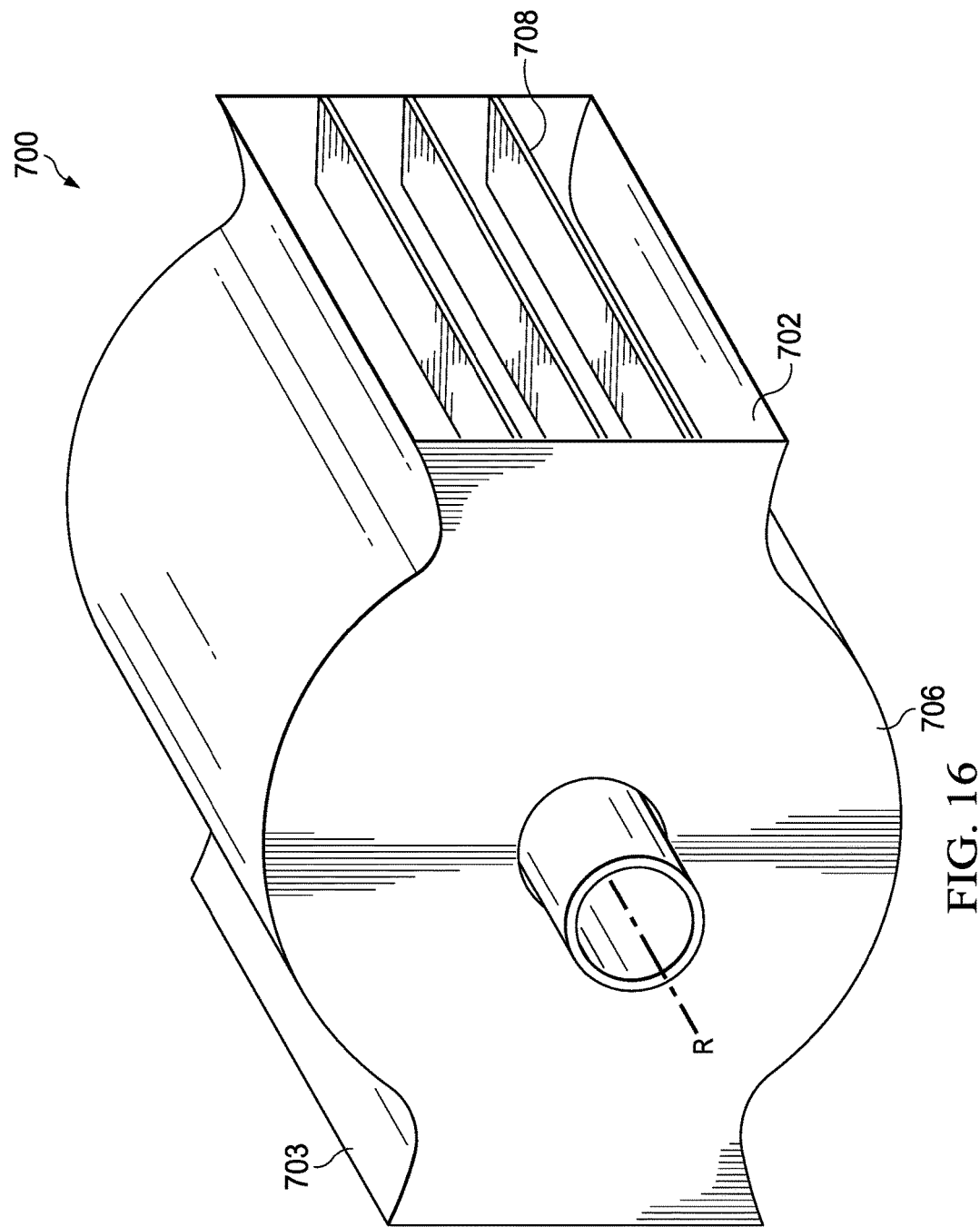
FIG. 16 is an isometric view of an interior duct in forward flight mode for a variable thrust cross-flow fan assembly in accordance with exemplary embodiments of the present disclosure.

Referring to FIG. 14 in the drawings, a variable thrust cross-flow fan system is schematically illustrated and generally designated 600. Variable thrust cross-flow fan assembly 600 includes a plurality of blades 602a-602h that are rotatably coupled to driver plates 604, 606. Blades 602a-602h are fixably coupled to respective linkages 608a-608h via driver pins 610a-610h. In contrast to previously illustrated embodiments, control cam 612 is non-rotating relative to cross-flow fan assembly 614 and drive shaft 616. Instead, control cam 612 includes one continuous follower slot 618 along which follower pins 620a-620h may move. Together, control cam 612, linkages 608a-608h, driver pins 610a-610h and follower pins 620a-620h may be considered a control assembly coupled to blades 602a-602h. As described in the above embodiments, movement of control cam 612 moves blades 602a-602h into different pitch angle configurations to provide variable thrust as well as reversible thrust in two or more directions Referring to FIGS. 15-16 in the drawings, a duct for a variable thrust cross-flow fan system is schematically illustrated and generally designated 700. Duct 700 provides an enclosure for the moving parts of a variable thrust cross-flow fan assembly and forces airflow to follow a predetermined path. Duct 700 may be mounted in or be formed integrally with a wing member. Duct 700 along with the respective wing member 60, 62, 64, 66 provide protection for fan blades of the cross-flow fan assembly, such as by preventing objects from hitting the blades, and prevents injury by creating a barrier between people and the blades.

In the illustrated embodiment, duct 700 includes an intake region 702, an exhaust region 703, and a fan region 706 disposed between the intake region 702 and exhaust region 703. Intake and exhaust regions 702, 703 allow air to pass through duct 700 so that thrust may be generated in the fan region 706 by a cross-flow fan assembly in accordance with the illustrative embodiments described above.

In one embodiment, each intake and exhaust regions 702, 703 of duct 700 can include a plurality of horizontal slats 708 to provide for directional control of the airflow and thrust of variable thrust cross-flow fan system. Slats 708 may be tilted such that a thrust generated by the cross-flow fan assembly has an upward or downward component, thereby providing roll and pitch control of the aircraft.

In another embodiment, each intake and exhaust region 702, 703 of duct 700 can include a plurality of vertical slats to provide for directional control of the airflow and thrust of variable thrust cross-flow fan system. Slats 708 may be adjustable or movable based on input from a pilot to enable thrust vectoring operations. For example, slats 708 may be tilted such that a thrust generated by the cross-flow fan assembly has a left or right component, thereby providing yaw control of the aircraft.

Duct 700 may be used to achieve a pressure differential that allows for more efficient thrust. In some examples, an 80-100% improvement in thrust may be achievable using such a pressure differential.

Figure 17:
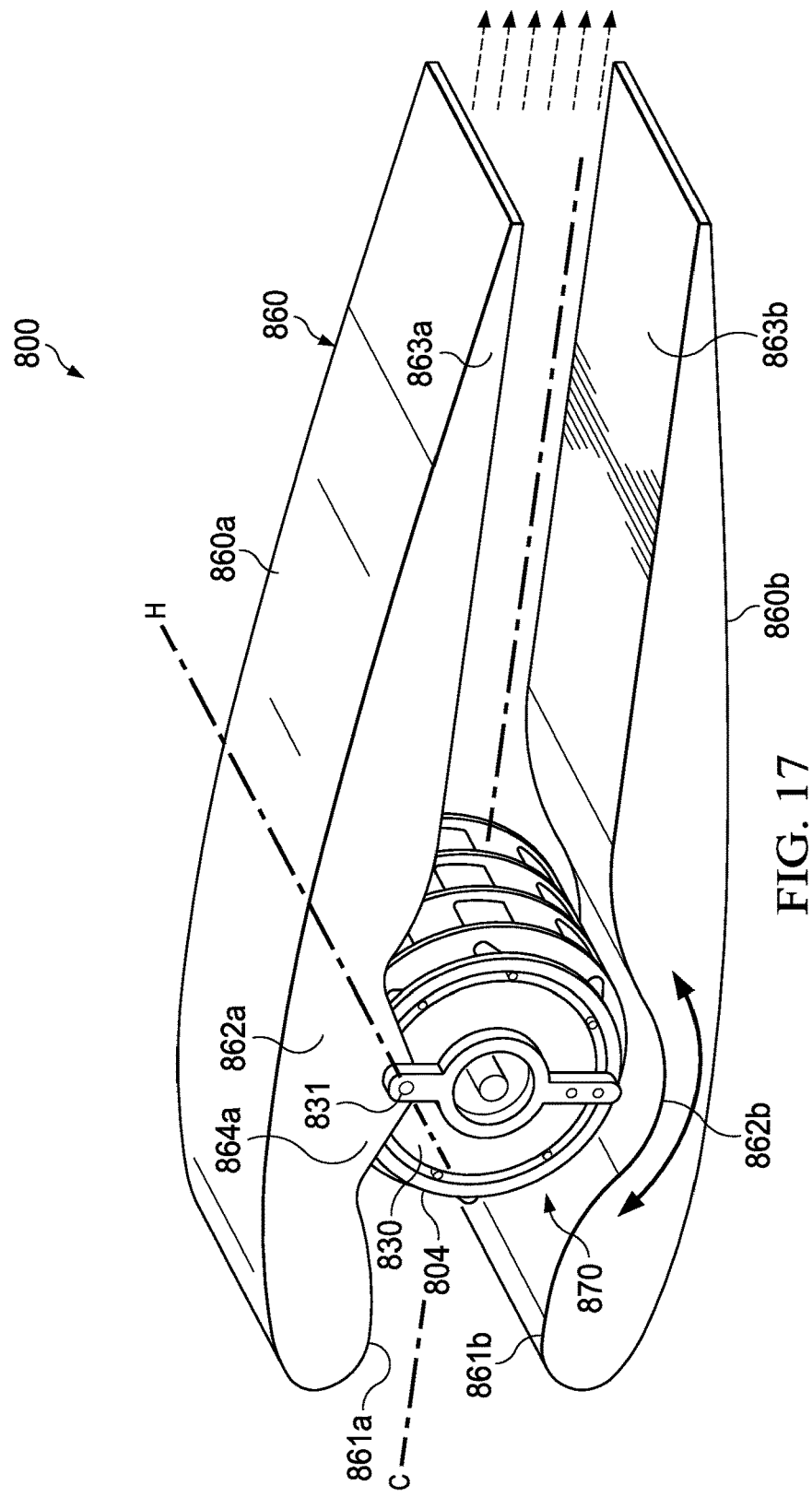
FIG. 17 is a schematic illustration of a cross-flow fan system in forward flight mode including wing members with an interior duct and a cross-flow fan assembly in accordance with exemplary embodiments of the present disclosure.
Figure 18:
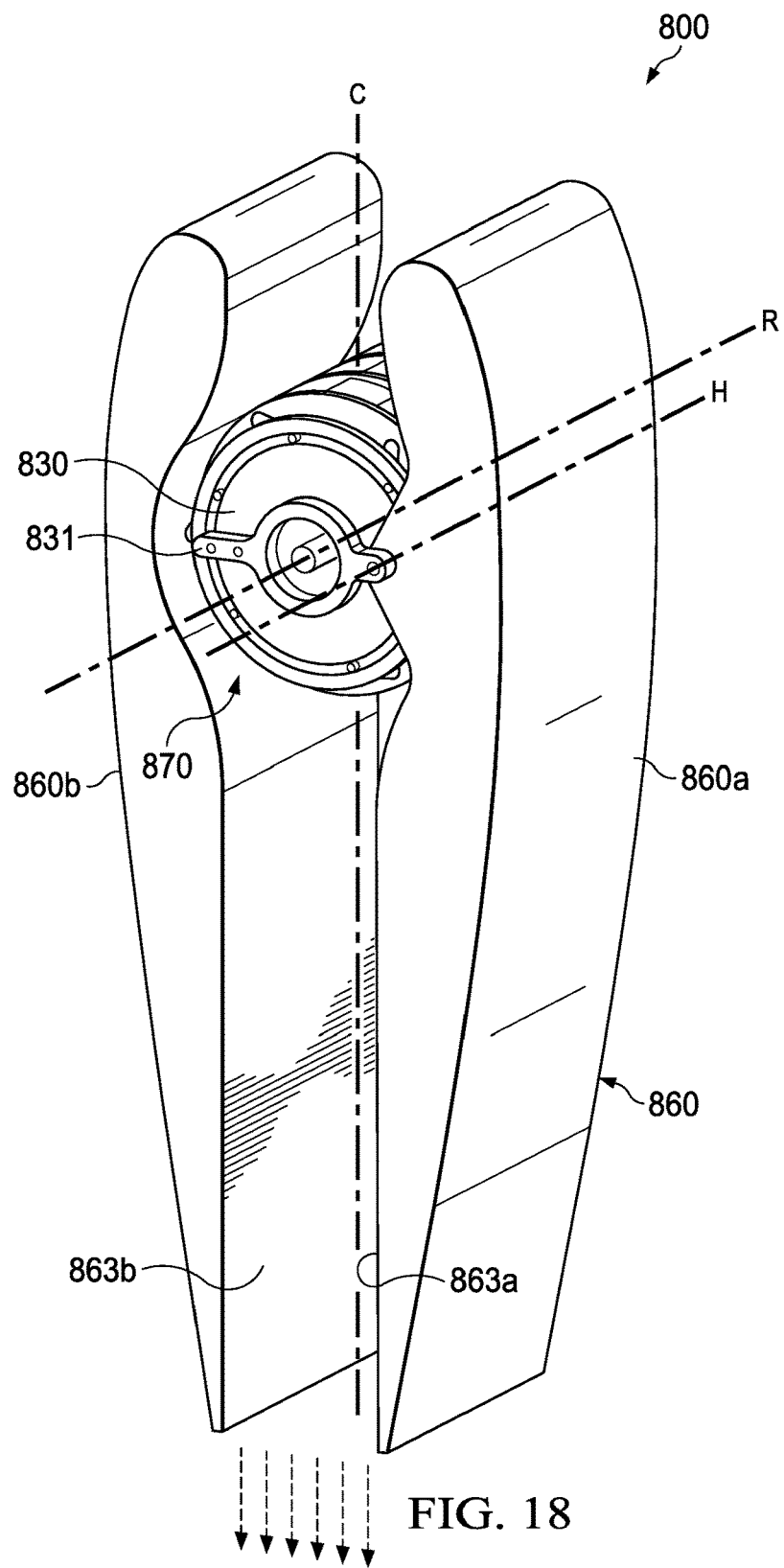
FIG. 18 is a schematic illustration of a cross-flow fan system in vertical flight mode including wing members with an interior duct and a cross-flow fan assembly in accordance with exemplary embodiments of the present disclosure.
Figure 19:
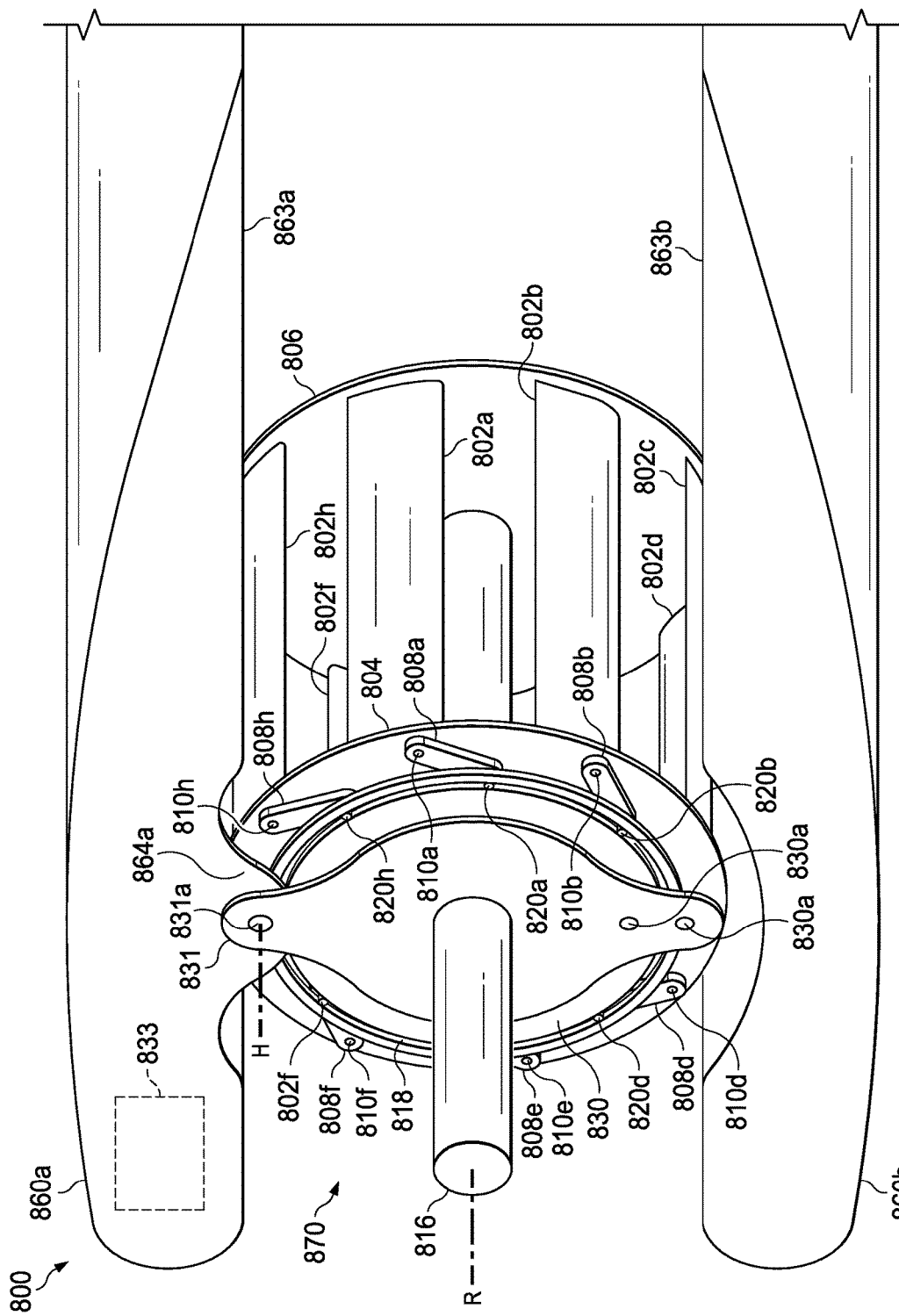
FIG. 19 is an isometric view of a variable thrust cross-flow fan assembly in accordance with exemplary embodiments of the present disclosure.

FIGS. 17-19 show schematic illustrations of a variable thrust cross-flow fan system and generally designated 800. The variable thrust cross-flow fan system 800 includes wing member 860 and variable thrust cross-flow fan assembly 870 according to an exemplary embodiment. Wing member 860 can have first wing member 860a and a second wing member 860b oriented generally parallel to each other. Each of the first and second wing members 860a, 860b includes an intake region 861a, 861b; a fan region 862a, 862b; and an exhaust region 863a, 863b. In an exemplary embodiment, the first wing member 860a includes an extended portion 864a. In other embodiments, the second member 860b includes an extended portion and the first wing member 860a does not include an extended portion 864a.

FIG. 17 is illustrative of the variable thrust cross-flow fan system 800 in forward flight mode such that the intake region 861a, 861b receives airflow therein and flows into the variable thrust cross-flow fan assembly 870 disposed in the fan regions 862a, 862b of the first and second wing members 860a, 860b. The variable thrust cross-flow fan assembly 870 generates a flow of air sufficient to generate a thrust force that exits between the exhaust regions 863a, 863b of the first and second wing members 860a, 860b. In forward flight mode, the first and second wing member 860a, 860b are oriented generally horizontally.

FIG. 18 shows the variable thrust-cross flow fan system 800 in vertical flight mode, the first and second wing members 860a, 860b are oriented generally vertically, which directs the thrust force downward. The first and second wing members 860a, 860b may be rotated by an actuator assembly 833 between a forward and vertical flight modes. It will be appreciated that the contemplated embodiment is configured showing forward and vertical flight modes. In other embodiments, the first and second wing members 860a, 860b may be positioned in a transition mode between the forward and vertical flight modes. In other embodiments, the first and second wing members 860a, 860b can be oriented such that the exhaust regions 863a, 863b function as air intake, and the intake regions 861a, 861b function to direct thrust forces from the fan region 862a, 862b outward to exit the variable thrust cross-flow fan system 800.

Variable cross-flow fan assembly 870 includes a plurality of blades 802a-802h that rotate about a rotatable fan axis R and are rotatably coupled to driver plates 804, 806. Blades 802a-802h are fixably coupled to respective linkages 808a-808h via driver pins 810a-810h. In contrast to previously illustrated embodiments, control cam 830 is non-rotating relative to driver plates 804, 806 and drive shaft 816. Instead, control cam 830 includes one continuous follower slot 818 along which follower pins 820a-820h may move. A hinge member 831 is fixedly connected to control came 830 by pins 830a and to the extended portion 864a of the first housing member 860a by pin 831a. As the fan assembly 870 rotates to generate a thrust force, the exhaust regions 863a, 863b of the first and second wing members 860a, 860b direct the thrust force generally along a chord axis C, as shown in FIGS. 17-18.

In forward flight mode, the thrust force in the exhaust regions 863a, 863b is oriented horizontally, as shown in FIG. 17. To change direction of the thrust force, the first and second wing members 860a, 860b are rotated by the actuator assembly 833. As the first housing member 860a is rotated by the actuator 833, the hinge member 831 is also rotated. In an embodiment shown in FIGS. 17-18, the first housing member 860a rotates about a hinge axis H that is independent of and about the rotatable fan axis R, which rotates the hinge member 831 and control cam 830. The rotation imparted by the first housing member 860a onto the hinge member 831 and the control cam 830 changes the direction of the thrust force to be oriented vertically for vertical flight mode. It is contemplated that the thrust force oriented vertically can provide anti-torque forces. In an embodiment, the control cam 830 can change the pitch configurations of the blades 810a-810h to allow thrust force in vertical mode to be about 90 degrees from the horizontal in forward flight mode.

Actuator assembly 833 is schematically shown in FIG. 19 and can be a linear actuator, a rotary actuator, or still another type of actuator device that can rotate the first wing member 860a. The actuator device may be powered hydraulically, electrically, or still otherwise powered. In an embodiment, the actuator assembly 833 rotates the first wing member 860a, which is interconnected with the second wing member 860b. In an embodiment, the first wing member 860a and the second wing member 860b are in two-way communication between the slave and master. It is contemplated that actuator assembly 833 can be located on the second wing member 860b to impart rotation thereon, which can rotate the first wing member 860a. Still in other embodiments actuator assembly 833 can be disposed adjacent to, connected with, or as part of a rotatable drive shaft.

Together, hinge member 831, control cam 830, linkages 808a-808h, driver pins 810a-810h, and follower pins 820a-820h may be considered a control assembly coupled to blades 802a-802h. As described previously, movement of the control cam 830 by hinge member 831 can move blades 802a-802h into different pitch angle configurations to adjust the magnitude and direction of thrust. As previously discussed, with reference to FIGS. 10A-10E, 11, and 12A-12C, there are an infinite number of pitch configurations of the blades 810a-810h. Advantageously, a separate system to power the control assembly is not required for the variable thrust cross-flow fan system 800.

While the illustrative embodiments are described as providing thrust for an aircraft or indeed for any object on which the variable thrust cross-flow fan system is mounted, the illustrative embodiments may also be used as a turbine in, for example, a generator. In these alternative embodiments, the pitch angle configuration of the blades may be changed in order to most effectively receive or harness a fluid, such as air or water, to turn the cross-flow fan assembly in a manner that produces energy.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

The invention claimed is:

1. A variable thrust cross-flow fan system for an aircraft comprising:
   a rotatable wing member having a first housing member, the first housing member having an intake region, an exhaust region, and a fan region between the intake region and the exhaust region;
   an actuator assembly operably coupled to the first housing member; and
   a variable thrust cross-flow fan assembly disposed within the fan region of the rotatable wing member, the variable thrust cross-flow fan assembly having a longitudinal axis and including a first and second driver plates having a plurality of blades rotatably mounted therebetween,
      the plurality of blades disposed radially outwardly from the longitudinal axis such that the plurality of blades has a generally circular path of travel when the cross-flow fan assembly rotates about the longitudinal axis, the plurality of blades moveable between a plurality of pitch angle configurations,
      a control assembly coupled to the plurality of blades operable to change the pitch angle configuration of the plurality of blades to generate a variable thrust force, the control assembly includes:
         a control cam that is substantially non-rotatable relative to the first and second driver plates, and
         a hinge member that is fixedly connected to the control cam and to the first housing member at a hinge axis;
   wherein rotation of the first housing member by the actuator assembly imparts rotation of the control cam about the hinge axis, thereby changing the direction of the variable thrust force.

2. The variable cross-flow fan system of claim 1, wherein the first housing member further comprises an extended portion in the fan region configured to be fixedly connected to the hinge member.

3. The variable thrust cross-flow fan system of claim 1, wherein the control assembly further comprises a plurality of linkages coupled to the control cam, the control cam coupled to the plurality of blades by the plurality of linkages wherein each of the plurality of linkages has an inner end and an outer end, the inner end of each of the plurality of linkages slidably coupled to the control cam, the outer end of each of the plurality of linkages fixedly coupled to one of the plurality of blades.

4. The variable thrust cross-flow fan system of claim 3, wherein the control cam forms at least one follower slot;
   wherein the inner end of each of the plurality of linkages includes a follower pin; and
   wherein the follower pin of each of the plurality of linkages is slidably engaged with the at least one follower slot.

5. The variable thrust cross-flow fan system of claim 3, wherein the control cam forms a continuous follower slot;
   wherein the inner end of each of the plurality of linkages includes a follower pin; and
   wherein the follower pin of each of the plurality of linkages is slidably engaged with the continuous follower slot.

6. The variable thrust cross-flow fan system of claim 1, wherein the plurality of pitch angle configurations includes at least one right thrust configuration, a neutral configuration and at least one left thrust configuration.

7. The variable thrust cross-flow fan system of claim 1, wherein the plurality of pitch angle configurations includes at least one upward thrust configuration, a neutral configuration and at least one downward thrust configuration.

8. The variable thrust cross-flow fan system of claim 1, wherein the plurality of pitch angle configurations includes pitch angle configurations wherein each of the plurality of blades changes pitch angle during each revolution around the generally circular path of travel.

9. The variable thrust cross-flow fan system of claim 1, wherein the plurality of pitch angle configurations includes pitch angle configurations wherein each of the plurality of blades fluctuates between a positive pitch angle and a negative pitch angle during each revolution around the generally circular path of travel.

10. The variable thrust cross-flow fan system of claim 9, wherein the plurality of pitch angle configurations includes pitch angle configurations wherein one or more blades of the plurality of blades has the negative pitch angle while one or more blades of the plurality of blades has the positive pitch angle.

11. The variable thrust cross-flow fan system of claim 1, wherein the variable thrust is a reversible thrust.

12. The variable thrust cross-flow fan system of claim 1, wherein the control assembly is operable to change the pitch angle configuration of the plurality of blades to selectively generate thrust in a plurality of directions including a first direction and a second direction, the first direction substantially opposite from the second direction.

13. The variable thrust cross-flow fan system of claim 1, wherein the rotatable wing member further comprises a second housing member, the second member having an intake region, an exhaust region, and a fan region between the intake region and the exhaust region.

14. The variable thrust cross-flow fan system of claim 13, wherein the variable thrust cross-flow fan assembly is disposed between the first housing member and the second housing member.

15. The variable thrust cross-flow fan system of claim 13, wherein the first housing member and the second housing member are interconnected.

16. The variable thrust cross-flow fan system of claim 1, wherein the direction of the thrust is generally parallel to the chord axis.

17. The variable thrust cross-flow fan system of claim 15, wherein the direction of the variable thrust force is an anti-torque thrust force.

18. The variable thrust cross-flow fan system of claim 1, wherein the actuator assembly comprises at least one of the following:
   a linear actuator; and
   a rotary actuator.

19. A method of directing the thrust of a variable cross flow fan system comprising the steps of:
   providing an aircraft having at least one variable thrust cross-flow fan system disposed on the fuselage comprising:

a rotatable wing member having a first housing member, the first housing member having an intake region, an exhaust region, and a fan region between the intake region and the exhaust region;

an actuator assembly operably coupled to the first housing member; and a variable thrust cross-flow fan assembly disposed within the fan region of the rotatable wing member, the variable thrust cross-flow fan assembly having a longitudinal axis and including a first and second driver plates having a plurality of blades rotatably mounted therebetween, the plurality of blades disposed radially outwardly from the longitudinal axis such that the plurality of blades has a generally circular path of travel when the cross-flow fan assembly rotates about the longitudinal axis, the plurality of blades moveable between a plurality of pitch angle configurations, a control assembly coupled to the plurality of blades operable to change the pitch angle configuration of the plurality of blades to generate a variable thrust force, the control assembly includes:
- a control cam that is substantially non-rotatable relative to the first and second driver plates, and
- a hinge member that is fixedly connected to the control cam and to the first housing member at a hinge axis;

rotating the wing member by the actuator assembly to impart rotation of the control cam about the hinge axis to change the direction of the variable thrust force.

\* \* \* \* \*